(12) United States Patent
Zilles et al.

(10) Patent No.: US 10,619,044 B2
(45) Date of Patent: Apr. 14, 2020

(54) THERMOTROPIC POLYMERS

(71) Applicants: Quarzwerke GmbH, Frechen (DE); Fraunhofer-Gesellschaft Zur Förderung Der Angewandten Forschung E.V., München (DE)

(72) Inventors: Jörg Ulrich Zilles, Köln (DE); Dirk Kruber, Alfter (DE); Arno Seeboth, Berlin (DE); Olaf Mühling, Frechen (DE); Ralf Ruhmann, Berlin (DE)

(73) Assignee: QUARZWERKE GMBH, Frechen (DE)

( * ) Notice: Subject to any disclaimer, the term of this patent is extended or adjusted under 35 U.S.C. 154(b) by 265 days.

(21) Appl. No.: 14/654,269

(22) PCT Filed: Dec. 19, 2013

(86) PCT No.: PCT/EP2013/077443
§ 371 (c)(1),
(2) Date: Jun. 19, 2015

(87) PCT Pub. No.: WO2014/096222
PCT Pub. Date: Jun. 26, 2014

(65) Prior Publication Data
US 2015/0329715 A1 Nov. 19, 2015

(30) Foreign Application Priority Data

Dec. 21, 2012 (EP) .................................... 12198837

(51) Int. Cl.
| | | |
|---|---|---|
| *C08L 33/14* | (2006.01) | |
| *C08F 236/20* | (2006.01) | |
| *C08L 25/14* | (2006.01) | |
| *C09K 9/02* | (2006.01) | |

(52) U.S. Cl.
CPC ............ *C08L 33/14* (2013.01); *C08F 236/20* (2013.01); *C08L 25/14* (2013.01); *C09K 9/02* (2013.01); *Y10T 428/2982* (2015.01)

(58) Field of Classification Search
CPC .................................................. C08F 236/20
See application file for complete search history.

(56) References Cited

U.S. PATENT DOCUMENTS

| | | | |
|---|---|---|---|
| 2,606,174 A | 8/1952 | Kolthoff et al. | |
| 3,285,887 A | 11/1966 | Louis De Vries | |
| 4,415,644 A | 11/1983 | Tamaki et al. | |
| 4,521,505 A | 6/1985 | Podszun et al. | |
| 4,694,035 A * | 9/1987 | Kasai | C08F 257/02 |
| | | | 524/458 |
| 4,708,923 A * | 11/1987 | Myers, Jr. | C08F 2/22 |
| | | | 430/114 |
| 5,061,766 A | 10/1991 | Yamashita et al. | |
| 6,165,702 A * | 12/2000 | Smith | G03C 1/7614 |
| | | | 430/536 |
| 7,416,783 B2 * | 8/2008 | Higashi | C08J 3/12 |
| | | | 427/222 |

(Continued)

FOREIGN PATENT DOCUMENTS

| | | |
|---|---|---|
| CN | 1930192 A | 3/2007 |
| CN | 101967212 A | 2/2011 |

(Continued)

OTHER PUBLICATIONS

Machine translation of JP 04-198351, published Jul. 17, 1992. (Year: 1992).*
Greenberg, et al., J. Am. Chem. Soc., 1954, 76 (24), pp. 6280-6285. (Year: 1954).*
The Notification of Opinion of the Examination in Taiwanese Patent Application No. 102147518, dated Nov. 5, 2015.
Araujo et al, Techniques for Reducing Residual Monomer Content in Polymers: A Review, Polymer Engineering and Science, Jul. 2002, 42(7), pp. 1442-1466.
Leyrer et al., Emulsion Polymerization of Hydrophobic Monomers like Stearyl Acrylate with Cyclodextrin as a Phase Transfer Agent, W. Mächtle, Macromol. Chem. Phys. 2000, 201, pp. 1235-1243.
O'Leary et al., Physical Properties of Poly(n-Alkyl Acrylate) Copolymers, Part 1, Crystalline/Crystalline Combinations, Polymer 2006, 47, pp. 1226-1244.
SARAC, Redox Polymerization, Prog. Polym. Sci. 1999, 24, pp. 1149-1204.

(Continued)

*Primary Examiner* — Vickey Nerangis
(74) *Attorney, Agent, or Firm* — Venable LLP; Keith G. Haddaway

(57) ABSTRACT

Polymer particles having a mean primary particle diameter d50 between 50 nm and 10 pm based on the total weight, containing: A. 10 to 100% by weight of a polymer phase A, obtainable by free-radical copolymerization of an oil-in-water miniemulsion having a monomer mixture as oil phase, containing i) 30 to 99.9% by weight of one or more mono-ethylenically unsaturated monomers II having at least one $C_{12}$-$C_{48}$-n-alkyl side chain, ii) 0 to 60% by weight of one or more mono-ethylenically unsaturated monomers II having at least one $C_1$-$C_{11}$-n-alkyl and/or one $C_3$-$C_{48}$-i-alkyl side chain, iii) 0.1 to 20% by weight of one or more monomers III having at least two non-conjugated ethylenic double bonds, iv) 0 to 69.9% by weight of one or more (hetero)aromatic, mono-ethylenically unsaturated monomers IV, v) 0 to 40% by weight of one or more other mono-ethylenically unsaturated monomers V; and B. 0 to 90% by weight of a polymer phase B, obtainable by subsequent free-radical graft copolymerization, in the presence of the polymer phase A obtained after stage A), of a monomer mixture containing i) 0 to 100% by weight of one or more monomers VI from the group of $C_1$-$C_{10}$-alkyl(meth)acrylates, ii) 0 to 100% by weight of one or more (hetero) aromatic, mono-ethylenically unsaturated monomers VII, iii) 0 to 50% by weight of one or more other mono-ethylenically unsaturated monomers VIII, where the percentages by weight of the monomer mixtures used in the respective stages add up to 100% by weight.

21 Claims, 2 Drawing Sheets

(56) References Cited

U.S. PATENT DOCUMENTS

| | | | |
|---|---|---|---|
| 2002/0193487 A1* | 12/2002 | Sakurai | C08K 3/22 524/409 |
| 2004/0152821 A1 | 8/2004 | Saegusa et al. | |
| 2005/0272865 A1 | 12/2005 | Taniguchi et al. | |
| 2006/0052515 A1* | 3/2006 | Schultes | C08F 285/00 524/556 |
| 2012/0065290 A1 | 3/2012 | Fang et al. | |

FOREIGN PATENT DOCUMENTS

| | | |
|---|---|---|
| EP | 1 258 504 B1 | 7/2004 |
| EP | 1 572 769 | 3/2008 |
| JP | 04198351 A * | 7/1992 |
| JP | H06-192341 A | 7/1994 |
| JP | 2002-363372 A | 12/2002 |
| WO | WO-2012/038441 A1 | 3/2012 |
| WO | WO-2012/110443 A1 | 8/2012 |

OTHER PUBLICATIONS

Saechtling .Kunststoff Kunststoff Taschenbuch, 30th Edition, Carl Hanser Verlag, Munich, 2007, Table 8-28, pp. 764-765.

CHERN, Emulsion Polymerization Mechanisms and Kinetics, Prog. Polym. Sci. 2006, 31,pp. 443-486.

Muehling et al., Variable Solar Control Using Thermotropic Core/ Shell Particles, 93, 2009, pp. 1510-1517.

Plate et al., Comb-like Polymers, Structures and Properties, Polymer Sci.: Macromolecular Reviews 1974, 8, pp. 117-253.

Vivaldo-Lima et al., An Updated Review on Suspension Polymerization, Ind. Eng. Chem. Res. 1997, 36, pp. 939-965.

International Search Report and Written Opinion in International Application No. PCT/EP2013/077443, dated Sep. 25, 2014. ,/.

Pileni, "Nanocrystals Forming Mesoscopic Structures," Section 4.3.2, lines 7-15, p. 110, dated Dec. 31, 2005.

The Notification of Opinion of the Examination in Taiwanese Patent Application No. 102147518, dated Apr. 1, 2015.

Office Action issued in Chinese Patent Application No. 201380067149. 5, dated Sep. 22, 2017.

* cited by examiner

THERMOTROPIC POLYMERS

This application is a national stage of International Application No. PCT/EP2013/077443, filed Dec. 19, 2013, which claims priority to EP 12198837.2, filed Dec. 21, 2012. The present invention relates to thermotropic molding compositions and processes for the preparation thereof. In particular, the application relates to polymer particles with a temperature-dependent refractive index, processes for the preparation thereof, and the use of such polymer particles as additives for the preparation of thermotropic plastics. Further, the invention relates to processes for the preparation of thermotropic plastics, and the use thereof.

Thermotropic materials reversibly change their scattering behavior of electromagnetic radiation when the temperature changes. Thermotropic materials have a high light transmission or are transparent in a particular temperature range, i.e., they exhibit no or only minimal light scattering. This state is also referred to as the OFF mode in the following. When this temperature range is either exceeded or fallen short of, an increase of light scattering is observed. The resulting turbid state is also referred to as the ON mode in the following. Thermotropism is a reversible process: When reaching the starting temperature, thermotropic materials return to their original state. Depending on the direction of the switching process, a distinction can be made between positive (increase of turbidity as the temperature rises) and negative thermotropism (decrease of turbidity as the temperature rises). Positive thermotropic materials are of particular interest, because they can be employed, for example, in the glazing of buildings, greenhouses or solar collectors, as shading elements for the temperature-dependent regulation of the intensity of incident radiation.

The scattering of electromagnetic radiation is effected on separate domains contained in a suitable matrix material. For scattering to occur, the domain and matrix must have different refractive indices. Generally, the scattering is particularly intensive if a) the difference between the refractive indices of the domain and matrix is as large as possible, b) the volume proportion of the scattering domains is high, and c) the size of the domains is similar to the wavelength of the electromagnetic radiation. In view of an application of thermotropic materials as shading elements (e.g., in building facades), the relevant quantity is not the total scattering intensity, but the backscatter fraction, because as much energy as possible is to be reflected, i.e., scattered into the rear half space, in the turbid state. A maximum backscatter efficiency is achieved when the diameter of the scattering domains is slightly below the wavelength of the light. Optimum backscatter properties for solar radiation (AM 1.5 Global) are obtained with diameters of d=200 to 400 nm (P. M. Nitz, "Optical modelling and surveying of thermotropic systems", doctoral thesis, Albert-Ludwigs-Universitat Freiburg, 1999). However, this optimum is very broad towards larger diameters, so that comparably good backscatter properties can also be achieved with domains in the size range of about 400 to 2000 nm.

Regarding the switching mechanism, two concepts (A and B) can be distinguished for positive thermotropic materials according to the prior art:

In concept A, the optical switching is based on reversible segregation and mixing processes. Such systems consist of at least two components with different refractive indices. In the OFF mode, the difference in refractive indices between these components cannot take effect, because they are homogeneously mixed on a molecular level. In this mode, the material has an averaged refractive index and is highly transparent in the ideal case. When a particular temperature, the lower critical solution temperature (LCST), is exceeded, phase separation occurs. Scattering domains are formed that predominantly or completely consist of one of the components. Now, since the refractive index of the scattering domains differs from that of the surrounding matrix, scattering occurs at the domain/matrix interface, and the material appears turbid. When cooled down below the LCST, the components mix again, and the scattering domains disappear, whereby the material returns to its original transparent state.

Thermotropic materials according to concept A, which are suitable for glazing elements, are either hydrogels (water/polymer mixtures) or polymer blends (mixtures of at least two polymers). Such LCST systems are frequently documented in the patent literature. For thermotropic hydrogels, there may be mentioned, as examples: U.S. Pat. Nos. 5,057,560, 5,147,923, EP 0 678 534, and EP 0 873 367. Thermotropic polymer blends are described, for example, in EP 0 611 803, and EP 0 181 485.

Thermotropic LCST systems have numerous disadvantages:

Segregation/mixing processes require a high mobility on the molecular level. After several switching cycles, partial macroscopic segregation may occur, which results in sites of permanent turbidity. Thus, a permanent and complete reversibility cannot be ensured.

Because minute changes in the composition already affect the phase behavior, LCST systems are very sensitive to impurities. Thus, for example, thermotropic polymer blends are very moisture-sensitive.

Because of the required molecular mobility, LCST systems do not show use properties typical of plastics. They do not function as independent, selfsupporting systems. Therefore, LCST systems are used in connection with support and cover layers, which are preferably made of glass or a transparent plastic. The integration of the thermotropic material between two layers is usually associated with a high technological expenditure. For thermotropic hydrogels, an edge composite that prevents water losses is additionally necessary. However, extensive tests have shown that the diffusion tightness of the edge composite towards water is hardly controllable for periods of more than ten years.

Thermotropic hydrogels cannot be processed as thermoplasts because of their water content. The extrusion of thermotropic polymer blends is difficult, because the individual polymer components usually have clearly different viscosities. In addition, the processing temperature is above the switching temperature of the polymer blend. After the extrusion, a homogeneous polymer blend is not obtained, so that the turbidity is irreversible, i.e., remains even at temperatures below the switching temperature. In EP 1 218 467, suitable auxiliaries (e.g., organic solvents) are added for the production by extrusion of multilayer sheets with a thermotropic polymer blend intermediate layer. Indeed, the segregation temperature can be increased thereby to be above the processing temperature. However, these auxiliaries must be removed without residue in an additional process step, because minute impurities may already adversely affect the phase behavior of the thermotropic polymer blend.

LCST systems are usually not permanently durable either under thermal load or in the sunlight. Sites of permanent turbidity, a decrease of the switching stroke, an increase of hysteresis, and yellow discoloration are observed as damage symptoms. Stabilizers, such as free-radical scavengers and light stabilizers, often remain ineffective and, in addition, can adversely affect the phase behavior.

LCST systems respond slowly to temperature changes, because the necessary diffusion processes proceed slowly. Thus, in particular, the transition from the turbid ON mode to the clear OFF mode may take several hours, and sometimes even days.

In thermotropic materials according to concept B, no segregation/mixing processes are involved. Here, the change in transmission is caused by different temperature dependencies of the refractive indices of the components involved. Thermotropic materials according to concept B also consist of at least two components: a domain-forming additive, and a transparent polymer as a matrix. In the OFF mode, the refractive indices of the domains and the matrix are optimally similar, so that a high transparency is achieved. As the temperature increases, a significant decrease of the refractive index of the domains is observed, whereas the refractive index of the matrix remains almost constant. The system thereby changes into a light-scattering, turbid state. In order to achieve a significant and possibly rapid change of the refractive index with temperature, materials exhibiting a phase transition in the range of the switching temperature are preferably employed as domain formers (thermotropic additives).

In EP 0 000 868, DE 44 33 090, EP 0 946 443, DE 198 25 984 and EP 1 258 504, low-molecular weight organic substances exhibiting a melting transition in the range of the switching temperature are used as a thermotropic additive. For domains to form in the respective transparent polymer matrix, the thermotropic additive must be at least partially insoluble in the polymer matrix. Alkanes, carboxylic acids, esters and amides thereof as well as comparable classes of compounds are mentioned as suitable classes of low-molecular weight substances. The thermotropic additive is incorporated in a pure, i.e., "unprotected", condition. This implies some disadvantages: Usually, the thermotropic additive is effective as a thermotropic substance only within a particular concentration range (e.g., 2-5%). Below this concentration range, it is completely soluble and does not form domains, i.e., the additive and matrix exist as a unitary phase. Important material properties of the polymer matrix (for example, the adhesiveness to glass or a comparable support) can be adversely affected thereby. The domain formation starts only above a particular additive concentration, which may vary considerably depending on the matrix. In contrast, at high additive concentrations, there is a risk that permanent scattering effects over the whole temperature range occur. The thermotropic switching property would largely be lost then. Another disadvantage relates to the long-term stability to be expected. In the light-scattering ON mode, the thermotropic additive is liquid and is thus readily subject to diffusion processes. A loss of the switching effect and permanent scattering effects ensue.

Different methods are proposed for preparing thermotropic layers with low molecular weight organic substances as thermotropic additives: In EP 0 946 443, a solvent-containing coating solution is first prepared, and then applied to a substrate (e.g., float glass) by means of known coating methods of paint technology (such as knife coating, spraying or flow coating). Subsequently, the solvent is evaporated, and thermally induced cross-linking is performed. When the solvent is evaporated, vapors harmful to the environment and health are released. Increased investment costs for occupational safety are required then. From DE 198 25 984, the preparation of thermotropic laminated glass panels based on UV-curing casting resin formulations is known. The thermotropic resins are filled into a gap between the panels, which is obtained by bonding two glass panels together with a suitable spacer between. The thermotropic resin is cured by irradiation with UV light. As a modification of this method, a process for preparing thermotropic sheets is claimed in EP 1 258 504. After the curing is complete, the two support panels are detached from one another by removing the spacer. In this way, a thermotropic sheet can be isolated. For the sheet to be detached easily, the support panel consists, for example, of a material with low adhesion properties (e.g., PTFE, silicone). In addition, EP 1 258 504 describes a method in which a solvent-free UV-curing formulation is applied to a planar support surface by means of a sheet casting device. After UV curing with exclusion of air, a thermotropic sheet results, which can be separated from the support layer. To conclude, it can be noted that none of the mentioned methods meets the requirements for an economically efficient production on a large industrial scale.

In the scientific literature (Solar Energy Materials & Solar Cells, 93, 2009, pp. 1510-1517), a further development is described in which the low molecular weight component is incorporated into the polymer matrix, not in a pure condition, but in the form of core/shell particles. The low molecular weight component—an nalkane mixture with a melting temperature of from 30 to 40° C.—forms the core and is coated with a protecting polymer shell. Encapsulating the low-molecular weight component yields a powdery material, which is always n the form of a solid in the range of the use temperature, and is clearly more easily to process as compared with the unprotected additive. The polymer shell prevents diffusion processes, so that the long-term stability is significantly improved. The technology for preparing casting resin laminated glass is established, but is not suitable for large-area applications. A transfer of this concept to current thermoplastic processing methods, such as sheet extrusion, is described in DE 10 2007 061 513, among others.

From EP 0 985 709, thermotropic plastic molding compositions are known in which specific copolymers instead of low molecular weight substances are employed as the thermotropic component. The copolymers employed are not thermodynamically miscible with the matrix polymer and therefore form domains within the polymer matrix after thermoplastic processing. Since the thermotropic component shows a higher temperature dependence of the refractive index as compared to the matrix, the resulting thermotropic molding composition exhibits reversible turbidity as the temperature increases. Ethylene/glycidyl methacrylate or ethylene/$C_{1-4}$-alkyl acrylate/glycidyl methacrylate copolymers (such as the Lotader® GMA types from Arkema) and methacrylate/butadiene/styrene copolymers (such as the Paraloid® BTA types from Rohm & Haas) are preferably employed as the thermotropic component. The transparent polymer matrix preferably consists of amorphous polyamides or copolyamides (such as the Grilamid® TR types from EMS Grivory). The two components are forcibly mixed into a thermotropic molding composition by compounding. For the further processing into molding parts, all common thermoforming processes can be applied, such as injection molding, injection blowing, and extrusion. In one embodiment, a transparent polyamide as a matrix component is compounded with an ethylene/glycidyl methacrylate copolymer (Lotader® GMA AX 8840) as a domain former, and after the injection molding process, processed into sheets (100×100×4 mm). The thus prepared thermotropic polyamide sheets exhibit an almost continuous decrease of transmission at 560 nm as the temperature increases (room temperature→80° C.). The degree of turbidity in the ON mode increases, as expected, as the concentration of the thermotropic additive increases. It is a disadvantage that the transmission also decreases significantly in the OFF mode as the additive concentration increases, so that the effective "switching stroke" (difference in transmission between the OFF and ON modes) is low. This disadvantageous effect occurs already at relatively low additive concentrations (<10%), which indicates an insufficient matching between the refractive indices of the additive and matrix. A high volume proportion of scattering domains, which is necessary for a high scattering intensity in the ON mode, with a simultaneously high transparency in the OFF mode cannot be achieved thereby. Because of the very broad switching range (room temperature→80° C.), these systems are not suitable for applications like, for example, overheating protection of buildings, in which a narrow switching temperature range of about from 25 to 40° C. or from 30 to 40° C. is demanded. In addition, the process described does not permit the domain size to be influenced selectively. Consequently, an optimization of the scattering properties (e.g., with respect to the backscatter fraction) is not possible.

It is the object of the present invention to provide thermotropic molding compositions that overcome at least some of the mentioned drawbacks of the prior art.

According to one aspect of the invention, the object is achieved by providing particles that can serve as a thermotropic additive. The particles according to the invention are obtainable by the copolymerization of a. from 30 to 95% by weight of one or more vinyl monomers with an alkyl side chain of at least 12 carbon atoms;
b. from 0.1 to 10% by weight of one or more cross-linking agents;
c. from 3 to 70% by weight of one or more vinyl monomers with 1 to 11 carbon atoms in an aliphatic side chain, which optionally includes one or more functional groups;
d. from 0 to 50% by weight of one or more vinyl monomers with an aromatic side group, which is optionally substituted.

According to the invention, such a particle is produced by polymerizing vinyl monomers having a long aliphatic side chain in which the number of carbon atoms is 12 or more, with vinyl monomers whose aliphatic side chain includes 1 to 11 carbon atoms, and may optionally include one or more functional groups. In contrast, the employed components a. are unsubstituted. One or more free-radical initiators are required for the polymerization.

Further, vinyl monomers that include aromatic side groups may be present, wherein said aromatic side groups may be substituted.

According to the invention, "vinyl monomer" means compounds of general formula $—CH_2=CR_1R_2$. In many cases, $R_2=H$, and $R_1$ includes the side chain optionally through a functional group.

Different vinyl monomers are known to the skilled person. Particularly suitable vinyl monomers for the process according to the invention include acrylates. Then, in the above mentioned formula, $R_2$ is $—C(=O)OR_3$, and $R_1=H$. In methacrylates, said $R_2$ of the above mentioned formula is $—C(=O)OR_3$, and $R_1$ is a methyl group. Further suitable compounds include acrylamides, in which $R_2$ is $—C(=O)—NHR_3$; vinyl ethers, in which $R_2$ is $—O—R_3$; and, for example, vinyl esters, in which $R_2$ of the above formula is $—O—C(=O)—R_3$.

$R_3$ then corresponds to the side chain/side group as defined in a., c. and d.

Further vinyl monomers are known to the skilled person.

For the definition of component a., $R_3$ is an unbranched alkyl group, i.e., acyclic and saturated. Preferred chain lengths include from 12 to 48 carbon atoms.

Compounds having at least two groups capable of reacting with the vinyl monomers are employed as component b. Diethylenically unsaturated or polyethylenically unsaturated vinyl monomers are particularly suitable as cross-linking agents or cross-linking mixtures.

For component c., group $R_3$ includes from 1 to 11 carbon atoms of an aliphatic. These too may basically be acyclic or cyclic, and in part unsaturated. In this case, however, R may comprise several functional groups, for example, hydroxy groups, esters, ethers, amides, amines, halogens, carboxy groups, and combinations thereof. For example, component c. could include one or two or three hydroxy groups in radical $R_2$. R could also include one, two or three ester groups. A combination of a hydroxy group and a halide would also be possible. Mixtures of different vinyl monomers that meet the conditions of c. are also suitable.

As an optional component, a vinyl monomer in which $R_3$ is an aromatic side group can be contained as component d. Aromatic molecules have a ring system comprising delocalized electrons in conjugated double bonds, or unoccupied p orbitals, or lone electron pairs. Preferred compounds of this type are phenyl compounds. According to the invention, these may also be substituted, preferably with halogens. The use of electron-rich heteroaromatics is preferred.

In one embodiment, another layer is grafted onto the particle according to the invention, which layer is obtained by the polymerization of vinyl monomers with 1 to 11 carbon atoms in an aliphatic or aromatic side chain, i.e., $R_3$ is an aliphatic or aromatic group with 1 to 11 carbon atoms in this case.

For the grafting of another layer, bi- or multifunctional cross-linking agents with at least two differently reactive carbon-carbon double bonds are used.

The particles according to the invention exhibit a first order phase transition in a temperature range of from −20 to 150° C.

The particles according to the invention are preferably prepared with an average particle diameter of from 100 to 10,000, or from 100 to 2000 nm, preferably from 100 to 500 nm. The average particle diameter d50 is the value for which 50% by weight of all particles are heavier than the stated value, and 50% are lighter than the stated value. Such d50 values are determined, for example, by laser refraction.

Preferably, the particles have a relatively narrow distribution. Thus, the particle diameter d90 value is preferably not greater than three times the d50 value. Thus, for example, if the d50 value is 200 nm, the d90 value is preferably 600 nm or less. The ratio of d90 to d50 values is thus preferably ≤3, more preferably ≤2.

The particles according to the invention may further contain from 0 to 10% by weight of inorganic particles. Particularly suitable particles include silicates and oxides of the elements Al, Si, Zr, Hf, Ti, Zn, Pb, and possible mixed oxides thereof.

The invention also relates to a molding composition containing a matrix and from 1 to 50% by weight of the particles according to the invention, or of particles defined at least by the components a. and b., namely:

Particles obtainable by the polymerization of a. from 30 to 99.9% by weight of one or more vinyl monomers with an alkyl side chain of at least 12 carbon atoms;
b. from 0.1 to 10% by weight of one or more cross-linking agents;
c. from 0 to 70% by weight of one or more vinyl monomers with 1 to 11 carbon atoms in an aliphatic side chain, which optionally includes one or more functional groups;
d. from 0 to 50% by weight of one or more vinyl monomers with an aromatic side group, which is optionally substituted.

Such a molding composition is a thermotropic molding composition if it can change its light transmission under the action of heat.

Between the particles and the matrix material, the difference of the refractive indices is preferably <0.5, or <0.3, or <0.2, or <0.1, or <0.05, or <0.01, based on the light-transmitting state.

The refractive index can be controlled by selecting the components a. to d. in the particle.

Preferably, the matrix material itself is transparent or translucent. Within the scope of the invention, "transparency" means light transmission with simultaneous look or image transparency. To distinguish it from transparency, "translucency" means light transmission without look or image transparency.

Transparent and translucent molded parts are defined by a $Tvis_{nh}$ of 75%, preferably 80%, under the measuring conditions stated in the Examples for optical characterization, with test specimens analogous to those of Example 6.

In another embodiment of the invention, the object is achieved by the one- or two-phase polymer particles according to the invention with an average primary particle diameter of from 50 nm to 10 µm, preferably from 100 to 2000 nm, especially from 200 to 1000 nm, or from 500 to 1000 nm, containing, based on their total weight:
A) from 10 to 100% by weight of a polymer phase A, obtainable by free-radical copolymerization of an oil-in-water mini-emulsion with a monomer mixture as the oil phase, comprising
  i) 30 to 99.9% by weight of one or more mono-ethylenically unsaturated monomers I with at least one $C_{12}$-$C_{48}$ n-alkyl side chain;
  ii) 0 to 60% by weight of one or more mono-ethylenically unsaturated monomers II with at least one $C_1$-$C_{11}$ n-alkyl and/or one $C_3$-$C_{48}$ i-alkyl side chain;
  iii) 0.1 to 20% by weight of one or more monomers III with at least two non-conjugated ethylenic double bonds;
  iv) 0 to 69.9% by weight of one or more (hetero)aromatic, mono-ethylenically unsaturated monomers IV;
  v) 0 to 40% by weight of one or more other mono-ethylenically unsaturated monomers V;
and
B) from 0 to 90% by weight of a polymer phase B, obtainable by the subsequent free-radical graft copolymerization, in the presence of the polymer phase A obtained after step A), of a monomer mixture comprising
  i) 0 to 100% by weight of one or more monomers VI from the group of $C_1$-$C_{10}$ alkyl(meth)acrylates;
  ii) 0 to 100% by weight of one or more (hetero)aromatic mono-ethylenically unsaturated monomers VII;
  iii) 0 to 50% by weight of one or more other mono-ethylenically unsaturated monomers VIII;
wherein the weight percentages of the monomer mixtures employed in the respective steps add up to 100% by weight.

Preferably, the polymerization is performed without adding an organic solvent in the organic phases. Such solvents may be, for example, n-alkanes, such as 1-octadecane.

Preferably, the polymer particles according to the invention do not have any anchoring groups in the surface of the particle core that deviate from the spherical arrangement.

The particles according to the invention exhibit a first order phase transition in a temperature range of from −20 to 150° C.

Within the scope of the present invention, the prefix "Cx—Cy—" (with x and y=1, 2, 3, etc., and y>x) means that the related alkyl compound, class of alkyl compounds or alkyl group may consist of x to y carbon atoms. Unbranched acyclic alkyl compounds, classes of alkyl compounds or alkyl groups bear the prefix "n-", while branched acyclic or cyclic ones bear the prefix "i-". "(Meth)acrylic" is short for acrylic or methacrylic compounds, "(hetero)aromatic" is short for aromatic or heteroaromatic compounds, and "(hetero)cyclic" is short for cyclic or heterocyclic compounds.

For the preparation of thermotropic plastics, the particles according to the invention are mixed with a suitable transparent or translucent plastic. In this plastic, the particles are, in the ideal case, homogeneously distributed in the form of separate domains. The plastic forms the matrix, optionally in combination with other additives, and is therefore also referred to as a matrix plastic in the following.

Differences in refractive index between the domains and matrix are characteristic of the occurrence of light scattering. At temperatures below the phase transition (OFF mode), the refractive indices of the domains, $n_D$, and of the matrix, $n_M$, are as similar as possible ($n_D=n_M$), so that the thermotropic plastic ideally exhibits the transparency or translucency of the pure matrix plastic. In the temperature range of the phase transition, the refractive index of the domains decreases abruptly (($n_D<n_M$), so that light is scattered at the domain/matrix interface, and the transparency or translucency is reduced (ON mode). The thermotropic plastic usually shows the largest change of transmission in the temperature range of the phase transition. This temperature range is also referred to as the "switching temperature" in the following.

The polymer phase A of the polymer particles according to the invention is a copolymer whose monomer units are selected from at least two (I, III) or from up to five different groups (I to V) or more. The monomers I are essential to the thermotropic switching behavior. Therefore, polymerization must involve at least one monomer I to form polymer phase A. In addition, polymer phase A is crosslinked with at least one monomer III, in order that the shape and size of the polymer particles according to the invention are preserved in the subsequent processing steps. In contrast, whether and in what weight percentages monomers from the other classes II, IV and V are included in the polymerization critically depends on the desired switching temperature and the properties of the matrix plastic (refractive index in the temperature range of the OFF mode, compatibility with the polymer particles, etc.).

The polymer phase A of the polymer particles according to the invention is constituted of 30 to 99.9% by weight, preferably 50 to 97% by weight, especially 60 to 95% by weight, or 75 to 85% by weight, monomer units with n-alkyl side chains of 12 to 48 carbon atoms (monomers I). In some embodiments, the length of the n-alkyl side chains is within a range of from 12 to 16 carbon atoms, in others, it is within a range of from 20 to 48 carbon atoms. In some embodiments, two or more different monomers are employed together.

After the free-radical polymerization, the monomers I form so-called comb polymers. They consist of a polymer main chain and many $C_{12}$-$C_{48}$ n-alkyl side chains bonded thereto. The side chains are usually covalently linked to the main chain through an anchoring group, for example, an ester group.

In contrast to conventional partially crystalline polymers (e.g., polyethylene), in which the main chain crystallizes, what crystallizes here are the n-alkyl side chains (see N. A. Plate, V. B. Shibaev, Comb-Like Polymers. Structure and Properties, Polymer Sci.: Macromolecular Reviews 1974, 8, pp. 117-253). The melting/crystallizing takes place at a particular phase transition temperature $T_m$. The phase transition temperature $T_m$ can be determined in the known way by means of differential scanning calorimetry (DSC). For side chain crystallization to occur, a minimum chain length is required, which may vary depending on the flexibility of the main chain. The minimum length is usually about 8 to 11 carbon atoms beyond the anchoring group. For side chains above the minimum length, the phase transition temperature $T_m$ increases as the length of the side chain increases. In an exemplary way, there may be mentioned the phase transition temperatures, as known from the literature, of the homopolymers of ntetradecyl acrylate: $T_m$=19.5° C.; and of those of n-docosyl acrylate: $T_m$=67.7° C. (see K. A. O'Leary, D. R. Paul, Physical properties of poly(n-alkyl acrylate) copolymers, Part 1. Crystalline/crystalline combinations, Polymer 2006, 47, pp. 1226-1244).

By copolymerizing two or more monomers I having side chains of different lengths, each phase transition temperature can be adjusted through the weight ratio within the temperature window defined by the homopolymers. Then, for copolymers of, for example, two monomers I having side chains of different lengths, it holds quite generally that: The higher the proportion of the shorterchain monomers (or the shorter its chain), the lower is the number of crystallizable carbon atoms in the copolymer, and the lower is the $T_m$.

The monomers I are preferably selected from the group:
Ia) of esters of α,β-ethylenically unsaturated $C_3$-$C_4$ carboxylic acids and $C_{12}$-$C_{48}$ n-alkanols;
Ib) of the mono- and dialkyl esters of α,β-ethylenically unsaturated $C_4$-$C_6$ dicarboxylic acids with at least one $C_{12}$-$C_{48}$ n-alkyl side chain as an ester radical; and
Ic) of the allyl and vinyl esters of $C_{13}$-$C_{49}$ n-alkanoic acids.

Further groups of free-radically polymerizable monoethylenically unsaturated monomers I with at least one $C_{12}$-$C_{48}$ n-alkyl side chain are known to the skilled person.

Preferred monomers I from group Ia) include the (meth) acrylates of n-dodecanol, n-tetradecanol, n-hexadecanol, n-octadecanol, n-docosanol, and n-octacosanol. In addition to the pure compounds, commercial mixtures of $C_{12}$-$C_{48}$ n-alkyl(meth)acrylates with n-alkyl radicals of different lengths (e.g., SA 1618 of BASF) may also be used. In some embodiments, no octadecyl acrylate is added.

The monomers I of group Ib) include the dialkyl esters of α,β-ethylenically unsaturated $C_4$-$C_6$ dicarboxylic acids with two identical $C_{12}$-$C_{48}$ n-alkyl groups, two different $C_{12}$-$C_{48}$ n-alkyl groups, one $C_{12}$-$C_{48}$ n-alkyl group and one n-alkyl or $C_3$-$C_{48}$ i-alkyl group, and the corresponding monoalkyl esters with a $C_{12}$-$C_{48}$ n-alkyl group. Preferably, the dialkyl esters of maleic and itaconic acid with n-dodecanol, n-tetradecanol, n-hexadecanol, n-octadecanol, n-docosanol and n-octacosanol are employed.

Preferred monomers I from group Ic) include the vinyl and allyl esters of ntetradecanoic, n-hexadecanoic, n-octadecanoic, n-docosanoic and n-octacosanoic acids.

For lowering the phase transition temperature $T_m$ of a polymer predominantly formed from monomers I, there may also be used, in particular, free-radically polymerizable monomers having a linear alkyl side chain with less than 12 carbon atoms or a branched cyclic or acyclic alkyl side chain with 3 to 48 carbon atoms (monomers II). The monomers II are included in the polymerization at from 0 to 60% by weight, preferably from 0 to 40% by weight, especially from 0 to 20% by weight, or from 1 to 60% by weight.

The monomers II are preferably selected from the group IIa) of esters of α,β-ethylenically unsaturated $C_3$-$C_4$ carboxylic acids and n-alkanols or $C_3$-$C_{48}$ alkanols, IIb) of mono- and diesters of α,β-ethylenically unsaturated $C_4$-$C_6$ dicarboxylic acids, and $C_1$-$C_{11}$ n-alkanols and/or $C_3$-$C_{48}$ i-alkanols, and IIc) the allyl and vinyl esters of $C_2$-$C_{12}$ n-alkanoic acids, and $C_4$-$C_{49}$ i-alkanoic acids.

Preferred monomers II from group IIa) include the (meth) acrylates of methanol, ethanol, n-propanol, isopropanol, n-butanol, sec-butanol, isobutanol, tertbutanol, n-hexanol, n-octanol, 2-ethylhexanol, n-decanol, isodecanol and isooctadecanol, cyclohexanol, 4-tert-butylcyclohexanol, borneol, isoborneol and 3,3,5-trimethylcyclohexanol, and dihydrodicyclopentadienyl(meth)acrylate.

Preferred monomers II from group IIb) include the diesters of maleic and itaconic acids with methanol, ethanol, n-butanol, isobutanol and 2-ethylhexanol.

Preferred monomers II from group IIc) include vinyl and allyl acetate and the corresponding propionates, butyrates, valerates, capronates, decanoates, and laurates. In some embodiments, no vinyl acetate is employed.

The scattering properties of the thermotropic plastic depend largely on the size of the scattering domains (see explanations above). The size of the scattering domains is primarily defined by the diameter of polymer phase A of the polymer particles according to the invention. For the shape and size of polymer phase A to be retained after the processing with the matrix plastic, polymer phase A is preferably cross-linked. Free-radically polymerizable di- or polyfunctional cross-linking agents (monomers III) are used for interior cross-linking. These include monomers with at least two non-conjugated ethylenic double bonds. Monomers III are included in the polymerization at 0.1 to 20% by weight, preferably from 0.1 to 10% by weight.

As di- and polyfunctional monomers III, there may be used: IIIa) the (meth)acrylic acid esters of polyhydric alcohols, IIIb) the vinyl and allyl ethers of polyhydric alcohols, and IIIc) (hetero)cyclic and (hetero)aromatic compounds disubstituted or polysubstituted with allyl, vinyl or (meth) acrylic groups.

Suitable di- or polyfunctional monomers III of group IIIc) include, for example, ethylene glycol di(meth)acrylate, 1,3-butanediol di(meth)acrylate, 1,4-butanediol di(meth)acrylate, 1,6-hexanediol di(meth)acrylate, 1,10-decanediol di(meth)acrylate, di(ethylene glycol)di(meth)acrylate, tri (ethylene glycol)di(meth)acrylate, tetra(ethylene glycol)di (meth)acrylate, di(propylene glycol)di(meth)acrylate, tri (propylene glycol)di(meth)acrylate, tricyclodecanedimethanol di(meth)acrylate, 2-hydroxy-1,3-di(meth)acryloxypropane, glycerol di(meth)acrylate, glycerol 1,3-diglycerolate di(meth)acrylate, neopentyl glycol di(meth)acrylate, diurethane di(meth)acrylate, trimethylolpropane ethoxylate methyl ether di(meth)acrylate, trimethylolpropane tri(meth)acrylate, trimethylolpropane ethoxylate tri(meth)acrylate (EO degree=3-20), trimethylolpropane propoxylate tri(meth)acrylate, pentaerythritol tri(meth)acrylate, glycerol propoxylate tri(meth)acrylate, di(trimethylol) propane tetra(meth)acrylate, pentaerythritol tetra(meth)

acrylate, di(pentaerythritol)penta(meth)acrylate, and di(pentaerythritol)hexa(meth)acrylate.

Suitable di- or polyfunctional monomers III of group IIIb) include, for example, 1,4-butanediol divinyl ether, 1,6-hexanediol divinyl ether, di(ethylene glycol)divinyl ether, bis[4-(vinyloxy)butyl]adipate, bis[4-(vinyloxy)butyl]succinate, bis[4-(vinyloxy)butyl]isophthalate, bis[4-(vinyloxy)butyl]terephthalate, bis[4-(vinyloxy)butyl]1,6-hexanediyl biscarbamate, 1,4-cyclohexane dimethanol divinyl ether, tris[4-(vinyloxy)butyl]trimellitate, allyl ether and trimethylolpropane diallyl ether.

Suitable di- or polyfunctional monomers III of group IIIc) include, for example, divinylbenzene, 2,4,6-triallyloxy-1,3,5-triazine, 1,3,5-triallyl-1,3,5-triazine-2,4,6(1H,3H,5H)trione, tris[2-(acryloyloxy)ethyl]isocyanurate, 1,3,5-triacryloylhexahydro-1,3,5-triazine, 2,2'-diallylbisphenol-A, 2,2'-diallylbisphenol-A diacetate ether, 1,4-phenylene di(meth)acrylate, bisphenol-A ethoxylate di(meth)acrylate (EO degree=2-30), bisphenol-A glycerolate di(meth)acrylate, bisphenol-A propoxylate glycerolate di(meth)acrylate, bisphenol-A di(meth)acrylate, and bisphenol-F ethoxylate di(meth)acrylate.

In the temperature range of the OFF mode, a transparency or translucency that ideally corresponds to that of the pure matric plastic is sought for the thermotropic plastics. For this purpose, it is required in most cases to match the refractive index of the polymer particles according to the invention to that of the respective matrix plastic. The refractive indices $n_D^{20}$ ($\lambda$=589 nm, 20° C.) of suitable transparent or translucent matrix plastics are within a range of 1.35 to 1.65, for the majority within a range of 1.49 to 1.59 (see Saechtling Kunststoff Taschenbuch, 30th Edition, Carl Hanser Verlag, Munich, 2007, Table 8.28, pp. 764-765). Homo- and copolymers formed from monomers I and optionally monomers II often have a lower refractive index at temperatures below the phase transition (OFF mode).

In order to match the refractive index of the polymer particles according to the invention in the temperature range of the OFF mode to that of the matrix plastic, the monomers are copolymerized with the (hetero)aromatic monomers IV, the homopolymers of monomers IV having a refractive index $n_D^{20}$>1.50, preferably $n_D^{20}$>1.55. They are copolymerized at 0 to 69.9% by weight, preferably at 0 to 50% by weight, especially at 0 to 30% by weight. In some embodiments, the content of monomers IV is at least 0.1% by weight.

The monomers IV are preferably selected from the group IVa) of vinyl(hetero)aromatics and IVb) of (hetero)aromatic (meth)acrylates.

Suitable monomers IV of group IVa) include, for example, styrene, 4-acetoxystyrene, 2-bromostyrene, 3-bromostyrene, 4-bromostyrene, 4-tert-butoxystyrene, 4-tert-butylstyrene, 2-chlorostyrene, 3-chlorostyrene, 4-chlorostyrene, 2,6-dichlorostyrene, 3,4-dimethoxystyrene, 2,4-dimethylstyrene, 2,5-dimethylstyrene, 4-ethoxystyrene, 3-methylstyrene, 4-methylstyrene, 4-vinylanisole, 3-vinylbenzylchloride, 4-vinylbenzylchloride, 9-vinylanthracene, 4-vinylbiphenyl, 2-vinylnaphthalene, 9-vinylcarbazole, N-vinylphthalimide, 2-vinylpyridine, 4-vinylpyridine, and 1-vinyl-2-pyrrolidinone.

Suitable monomers IV of group IVb) include, for example, benzyl(meth)acrylate, 2-hydroxy-3-phenoxypropyl(meth)acrylate, phenoxyethyl(meth)acrylate, phenyl(meth)acrylate, pentabromobenzyl(meth)acrylate, pentabromophenyl(meth)acrylate, 2,4,6-tribromophenyl(meth)acrylate, 9H-carbazole-9-ethyl(meth)acrylate, 2-hydroxypropyl-2-([meth]acryloyloxy)ethyl phthalate, 1-naphthyl(meth)acrylate, and 1-pyrenemethyl(meth)acrylate.

Alternatively or in addition to the monomers IV, crosslinking monomers III with an aromatic basic structure, such as divinylbenzene, may also be used to increase the refractive index.

For improving the preparation and processing properties of the polymer particles according to the invention, monoethylenically unsaturated monomers other than the monoethylenically unsaturated monomers I, II and IV may be used as monomers V. They are copolymerized at 0 to 40% by weight, preferably at 0 to 20% by weight, especially at 0 to 10% by weight, or at 1 to 40% by weight. In some embodiments, the content of monomers V is at least 0.1% by weight.

The monomers V are preferably selected from group Va) of $\alpha,\beta$-ethylenically unsaturated mono- and dicarboxylic acids, Vb) of $\alpha,\beta$-ethylenically unsaturated carboxylic anhydrides, Vc) of $\alpha,\beta$-ethylenically unsaturated carboxylic acid amides, and Vd) of hydroxy-, alkoxy-, carboxy-, amino-, epoxy-, sulfo-, silyl- and halo-substituted alkyl(meth)acrylates, and heterocyclic(meth)acrylates.

Suitable monomers V of group Va) include, for example, (meth)acrylic acid, maleic acid, and itaconic acid.

Suitable monomers V of group Vb) include, for example, maleic anhydride, itaconic anhydride, and crotonic anhydride.

Suitable monomers V of group Vc) include, for example, N-ethyl, N-isopropyl, N-tert-butyl, N,N-dimethyl, N,N-diethyl, N-hydroxymethyl, N-hydroxyethyl, N-(3-methoxypropyl), N-(butoxymethyl), N-(isobutoxymethyl), N-phenyl, N-diphenylmethyl, N-(triphenylmethyl) and N-[3-(dimethylamino)propyl](meth)acrylamides.

Suitable monomers V of group Vd) include, for example, 2-hydroxyethyl, 2-hydroxypropyl, 3-hydroxypropyl, 2-hydroxybutyl, 3-hydroxybutyl, 5-hydroxybutyl, hydroxyethylcaprolactone, 3-chloro-2-hydroxypropyl, 2-methoxyethyl, 2-ethoxyethyl, 2-butoxyethyl, di(ethylene glycol)methyl ether, di(ethylene glycol)ethyl ether, di(ethylene glycol) 2-ethylhexyl ether, tri(ethylene glycol)methyl ether, ethylene glycol dicyclopentenyl ether, ethyldiglycol, ethyltriglycol, butyldiglycol, 2-carboxyethyl, 2-(dimethylamino)ethyl, 2-(diethylamino)ethyl, 2-(diisopropylamino)ethyl, 2-(tert-butylamino)ethyl, 3-(dimethylamino)propyl, 2-[[(butylamino)carbonyl]oxy]ethyl, glycidyl, 2-(methylthio)ethyl, 3-(trimethoxysilyl)propyl, 2-(trimethylsilyloxy)ethyl, 3-[tris(trimethylsiloxy)silyl]propyl, trimethylsilyl, 2-chloroethyl, 2,2,2-trifluoroethyl, tetrahydrofurfuryl and 2-N-morpholinoethyl(meth)acrylates, and 4-(meth)acryloylmorpholine, mono-2-([meth]acryloyloxy)ethyl succinate, and mono-2-([meth]acryloyloxy)ethyl maleate.

In a preferred embodiment, the monomer phase for forming the polymer phase A contains:
  75 to 85% by weight monomer I;
  5 to 10% by weight monomer II;
  3 to 6% by weight monomer III, 4 to 6% by weight monomer VI;
  3 to 5% by weight monomer V.

In other embodiments, the weight percentages of the monomer phase for preparing the polymer phase A are:
  65 to 75% by weight monomer I;
  15 to 25% by weight monomer II;
  3 to 6% by weight monomer III;
  4 to 6% by weight monomer V.

In other embodiments, preferred contents of the monomer phase for preparing the polymer phase A are:
85 to 92% by weight monomer I;
3 to 6% by weight monomer III;
1 to 5% by weight monomer IV;
3 to 6% by weight monomer V.

In further embodiments, the contents of the monomer phase for forming the polymer phase A are:
85 to 92% by weight monomer I
3 to 7% by weight monomer III
4 to 8% by weight monomer V.

In further embodiments, preferred compositions of the monomer phase for preparing the polymer phase A are:
85 to 94% by weight monomer I
3 to 8% by weight monomer III
3 to 8% by weight monomer V.

The mentioned ingredients of the monomer phase for preparing the polymer phase A together amount to 100% by weight. In the mentioned embodiments, other ingredients may be contained in the monomer phase in principle. In addition to a polymerization initiator, these may also be admixtures of other substances in principle. Preferably, the further ingredients comprise less than 5% by weight, more preferably less than 3% by weight, even more preferably less than 1% by weight, or less than 0.5% by weight.

In some embodiments, the presence of polymer phase B is necessary.

The preparation of polymer phase A of the polymer particles according to the invention is effected by free-radical copolymerization of an oil-in-water mini-emulsion.

Polymer particles within a size range of from 50 nm to about 1 μm are typically produced by one-stage or multi-stage oil-in-water emulsion polymerizations (see, e.g., C. S. Chern, Emulsion polymerization mechanisms and kinetics, Prog. Polym. Sci. 2006, 31, pp. 443-486). For a better distinction from oil-in-water miniemulsion polymerization (o/w miniemulsion polymerization), the o/w emulsion polymerization is hereinafter referred to as "o/w macroemulsion polymerization". The starting point for the actual polymerization reaction is an o/w macroemulsion in which the monomers to be polymerized form the oil phase. The o/w macroemulsion is usually produced by simple mechanical stirring in the presence of a surfactant. The diameters of the monomer droplets are comparably large (>>1 μm), and the size distribution is broad. The monomer droplets are not the principal site of polymerization. They rather serve as a monomer reservoir, from which the aqueous phase is supplied with the monomer molecules that are at least partially water-soluble. The surfactant is usually employed above the critical micelle concentration (cmc). If this surfactant concentration is exceeded, several surfactant molecules associate into spherical micelles (≤10 nm), in whose center the monomer molecules can be incorporated. The initiator free radicals generated in the aqueous phase by water-soluble polymerization initiators can now initiate the polymerization both in the monomer droplets and in the micelles filled with monomer molecules. Because of the high number of micelles as compared to the monomer droplets, the total surface of the micelles is many times larger, so that a polymerization initiation within the micelles is very much more probable (micellar nucleation).

Industrially produced o/w macroemulsion polymerizates include, for example, impact modifiers for poly(meth)acrylate molding compositions. These two-phase or three-phase polymer particles with a core-shell or core-shell-shell morphology have a total diameter within a range of typically 100 to 300 nm (see, e.g., EP 1 572 769). However, this method is hardly suitable for the free-radical polymerization of extremely hydrophobic monomer, such as monomer I according to the invention. The water solubility of monomers I is usually insufficient for a monomer migration from the large monomer droplets through the aqueous phase to the site of polymerization. Only a few examples show that the diffusion of hydrophobic molecules can be promoted by suitable phase transfer agents, such as cyclodextrin (see, e.g., R. J. Leyrer, W. Machtle, Macromol. Chem. Phys. 2000, 201, pp. 1235-1243). However, this method is usually unsuitable for copolymerizations in which the weight percentage of the hydrophobic monomers in the total weight of the monomers is 50% by weight or more. In addition, comparably large amounts of phase-transfer agents are necessary, which causes additional costs for increased amounts of materials employed, for the separation of such additives, and recovery thereof, if possible.

Polymer particles formed from hydrophobic monomers can be synthesized by suspension polymerization in principle. Since the free-radical polymerization is started by oil-soluble initiators in such a case, the particle formation occurs almost exclusively in the monomer droplets rather than in the aqueous phase. However, the particle diameters of suspension polymerizates are usually considerably too large in view of the use according to the invention. Depending on the reaction conditions, polymer particles with diameters of from 10 μm to 5 mm are typically obtained (see, e.g., Eduardo Vivaldo-Lima et al., An Updated Review on Suspension Polymerization, Ind. Eng. Chem. Res. 1997, 36, pp. 939-965).

Therefore, miniemulsion technology is employed to form the polymer phase A of the polymer particles according to the invention (see, e.g., F. J. Schorck, Y. Luo, W. Smulders, J. P. Russum, A. Butte, K. Fontenot, Adv. Polym. Sci. 2005, 175, pp. 129-255). The o/w miniemulsion polymerization differs from the classical o/w macroemulsion polymerization in terms of processing conditions essentially by two peculiarities:
a) a homogenization step; and
b) optionally the addition of a costabilizer ("ultrahydrophobic").

In the homogenization step, an o/w miniemulsion is produced by the action of high shear forces, for example, in the form of ultrasound. The miniemulsion consists of kinetically stable droplets within the water phase that have a narrow size distribution mostly on a nano to submicro scale. The high stability of o/w miniemulsions as compared to o/w macroemulsions results from the cooperation of a surfactant and a costabilizer. While the surfactant stabilizes the droplets against collision and coalescence, the costabilizer prevents the so-called Ostwald ripening from occurring. The latter process includes the migration of monomers from the small to the larger droplets as a consequence of high Laplace pressure in the small droplets. The costabilizer is present in the droplet phase in a dissolved and homogeneously distributed form, having a very low water solubility, which is why it is also often referred to as "ultrahydrophobic". Since the costabilizer does not participate in the monomer migration through the aqueous phase because of its low water solubility, Ostwald ripening would create a concentration gradient between the monomer droplets. The formation of a concentration gradient is unfavorable from a thermodynamic point of view. Therefore, virtually no Ostwald ripening tykes place in the presence of a costabilizer. Typical costabilizers include, for example, long-chain alkanes, such as nhexadecane. No costabilizer is usually required for the synthesis of polymer phase A according to the invention, since the monomers I usually have sufficiently low water solubility and thus adopt the function of the costabilizer themselves. Performing the method without the addition of a costabilizer, especially of 1-octadecane, is preferred. In contrast to o/w macroemulsion polymerization, the particle nucleation takes place within the monomer droplets. This enables a very good control of the particle size, because a polymer particle is formed from almost every droplet. The droplet size and thus the particle size can be adjusted through the kind and amount of the surfactant. When ionic surfactants are used, the particle diameter is typically from 50 to 500 nm. Also, larger diameters of up to about 10 µm can be adjusted with non-ionic surfactants, or by using protective colloids and/or Pickering systems.

For the preparation of the polymer particles according to the invention, an o/w macroemulsion is produced at first in a per se known simple manner by mixing the respective monomers necessary for forming the polymer phase A into a uniform monomer phase, which is then introduced into an aqueous surfactant solution, for example, with mechanical stirring. Depending on the state of matter of the monomer I employed or of the mixture of two or more monomers I employed, it may be advantageous that the monomer phase is preliminarily heated for a uniform liquid monomer phase to result. In such a case, the temperature is preferably chosen only so high that the monomer phase is just uniformly liquid. As a rule, this temperature is around or slightly above the melting temperature of the monomer I or of the mixture of several monomers I employed. Advantageously, the aqueous surfactant solution is also preheated to this temperature in order to prevent the monomer or monomers I from coagulating when the two phases are combined. The aqueous surfactant solution may additionally contain buffer substances, such as sodium hydrogencarbonate, which provide for an advantageous pH of the aqueous phase in view of the later free-radical polymerization.

In principle, any anionic, cationic and non-ionic surfactants that are also suitable for o/w macroemulsion polymerizations may be used as surfactants. Preferably, anionic and/or non-ionic surfactants are used.

Common anionic surfactants include, for example, alkyl sulfates, alkyl sulfonates, alkylaryl sulfonates, alkyldiphenyloxide disulfonates, alkyl isethionates, alkyl sulfosuccinates, alkyl carboxylates, and alkyl phosphates with typically 8 to 18 carbon atoms in the alkyl radical. The counter-ion is usually an alkali cation (as a rule $Na^+$), or ammonium ($NH_4^+$).

Common non-ionic surfactants include, for example, ethoxylates of fatty alcohols, alkylphenols and fatty acids with typically 4 to 36 carbon atoms in the alkyl radical and a degree of ethoxylation of from 3 to 40.

Further common anionic and non-ionic surfactants are known to the skilled person. They are described, for example, in Ullmann's Encyclopedia of Industrial Chemistry, Surfactants, Wiley-VCH Verlag GmbH & Co. KGaA, Weinheim, 2012, DOI: 10.1002/14356007.a25_747.

The amount of surfactant is preferably chosen essentially so that the critical micelle concentration (cmc) in the aqueous phase of the finally resulting o/w miniemulsion is not exceeded. As a rule, the amount of surfactant is within a range of from 0.1 to 5% by weight, based on the amount of monomers contained in the o/w miniemulsion.

In order to prevent agglomeration, aggregation, coagulation or flocculation of the primary particles during the polymerization, it may be advantageous to additionally add protective colloids to the aqueous phase. Possible protective colloids include high molecular weight water-soluble compounds, such as poly(vinyl alcohol), poly(vinyl pyrrolidone) and its copolymers, and cellulose derivatives, such as methylcellulose and hydroxypropylcellulose. The use of poly (vinyl alcohol) is less preferred.

The o/w macroemulsion is homogenized by applying high shear forces to obtain an o/w miniemulsion as needed according to the invention. Such a high energy input can be produced by emulsifying machines, such as ultrasound reactors, high-pressure homogenizers, rotor-stator systems, static mixers, or combinations thereof. With increasing energy input, the droplet size in the emulsion decreases at first. The amount of energy can be adjusted through either the intensity or the duration of energy input. For each emulsion of a specific composition, there is a limit of optimum energy input, which leads to a minimum droplet size. When this minimum droplet size is reached, additionally introduced energy merely leads to a further reduction of droplet size distribution.

The miniemulsion used according to the invention is an essentially aqueous emulsion of monomers, stabilized by surface-active substances and having a particle size of the emulsified droplets of 10 nm to 600 nm, especially 40 nm to 450 nm, preferably 50 nm to 400 nm.

The proportion of monomer phase A in the total weight of the o/w miniemulsion is from 5 to 70% by weight, preferably from 20 to 50% by weight, or from 20 to 40% by weight. Preferably, the proportion of the organic phase is more than 15% or more than 20%, or more than 25% by weight.

As free-radical polymerization initiators for forming the polymer phase A, there may be used, in principle, any compounds that are capable of initiating a free-radical polymerization. In contrast to o/w macroemulsion polymerization, oil-soluble initiators may also be used in addition to water-soluble ones.

Suitable oil-soluble free-radical polymerization initiators include the common peroxo and azo compounds, such as dilauroyl peroxide, dibenzoyl peroxide, tert-amyl peroxypivalate, tert-amyl peroxy-2-ethylhexanoate, 2,2'-azodi (isobutyronitrile) and 1,1'-azobis(cyclohexanecarbonitrile).

Suitable water-soluble free-radical polymerization initiators include, for example, the ammonium and alkali peroxodisulfates, cumene hydroperoxide, tert-butylhydroperoxide, and hydrogen peroxide.

So-called redox initiator systems may also be used as polymerization initiators. The water-soluble polymerization initiators mentioned above, for example, are suitable as oxidants for redox-initiated polymerization. Suitable reducing agents include, for example, sodium dithionite, sodium disulfite, sodium hydrogensulfite, and ascorbic acid. Further, the effectiveness of the redox catalyst systems can be further improved by adding metal salts, such as iron salts, optionally in combination with complexing agents. Further common redox initiator systems are described, for example, in A. S. Sarac, Redox polymerization, Prog. Polym. Sci. 1999, 24, pp. 1149-1204.

Depending on the state of matter and solubility behavior of the free-radical polymerization initiator, it may be supplied in bulk, as a solution, as a suspension, or as an emulsion.

Water-soluble polymerization initiators are added to the o/w miniemulsion preferably as an aqueous solution only after the homogenization step. The risk of premature polymerization, especially during the energy-intensive homogenization step, can be minimized thereby.

Oil-soluble polymerization initiators having a sufficiently high decay temperature and a good solubility in the monomer phase can usually be added to the monomer phase before the preparation of the o/w macroemulsion, and completely dissolved in the latter. Oil-soluble polymerization initiators having a low decay temperature are preferably added only at a later time, preferably after the homogenization step as a solution, suspension or emulsion.

The addition of the polymerization initiators may be done completely, in portions, or continuously. Alternatively, part of the polymerization initiator may be added at once, and the remaining part metered continuously or in portions over an extended period of time.

In some cases, it may be advantageous that two or more different oil- and/or water-soluble polymerization initiators are used. These preferably have different decay temperatures and are added at different times before and/or during the polymerization reaction.

Usually, from 0.1 to 5% by weight of free-radical polymerization initiator is employed, based on the amount of monomers to be polymerized.

The polymerization temperature mainly depends on the decay temperature of the free-radical polymerization initiators employed. Typical polymerization temperatures are from 20 to 100° C., especially from 50 to 95° C. Under conditions of increased pressure, the polymerization temperature may also be more than 100° C. The polymerization is usually performed under normal pressure.

The reaction times for forming the polymer phase A are usually from 1 to 10 hours, mostly from 1.5 to 4 hours.

In a further synthesis step, a second polymer phase B that is different in chemical composition from polymer phase A can be grafted onto the polymer phase A prepared by o/w miniemulsion polymerization. The synthesis conditions are selected so that polymer particles with a core-shell morphology result. Polymer phase A then forms the inner core, and polymer phase B forms the outer shell.

Whether an outer polymer phase B is required essentially depends on the compatibility between the polymer phase A and the matrix plastic. When the compatibility is insufficient, the polymer particles according to the invention are insufficiently distributed in the matrix plastic. The particles then often form larger agglomerates or aggregates, whereby the material properties and optical properties of the matrix plastic are adversely affected.

If the polymer phase A and matrix plastic are highly compatible, preferably no further polymer phase B is grafted onto polymer phase A. There are two main reasons for this: 1) Because of polymer phase B, the weight proportion of polymer phase A in the total particle weight decreases. Consequently, in order to obtain a thermotropic plastic with comparable switching properties, the concentration of polymer particles in the thermotropic plastic must be increased, because only polymer phase B contributes to the thermotropic switching effect. This increases the required amount of materials, which usually causes additional cost. In addition, a higher particle concentration can adversely affect the material properties of the matrix plastic. 2) An additional polymer phase can reduce the transparency of the thermotropic plastic in the OFF mode. Because of the different chemical compositions, the refractive indices of polymer phases A and B as well as the matrix are also at least slightly different.

If a second polymer phase B is grafted onto polymer phase A, the weight proportion of polymer phase B in the total weight of the particles according to the invention is from 5 to 90% by weight, preferably from 10 to 50% by weight, especially from 15 to 35% by weight.

For the grafting of polymer phase B, monomers III having two non-conjugated ethylenic double bonds of different reactivity are preferably used in the synthesis of polymer phase A. In such graft cross-linking agents, a free-radically polymerizable double bond (e.g., of a methacrylic group) reacts at a similar rate as that of monomers I. The second double bond (e.g., of an allyl group) polymerizes at a significantly lower rate, so that some of these double bonds remain unchanged at the end of the polymerization. In this way, a graft cross-linking between two polymer phases is possible.

In particular, allyl, methallyl and crotyl esters of $\alpha,\beta$-ethylenically unsaturated carboxylic acids and dicarboxylic acids, preferably allyl(meth)acrylate and diallyl maleate, are suitable as graftable monomers III.

The polymer phase B of the polymer particles according to the invention consists of from 0 to 100% by weight of one or more monomers VI from the group of $C_1$-$C_{10}$ alkyl(meth) acrylates, from 0 to 100% by weight of one or more (hetero)aromatic mono-ethylenically unsaturated monomers VII, and from 0 to 50% by weight of one or more other mono-ethylenically unsaturated monomers VIII.

The monomer selection or the selection of the weight proportion of monomers VI to VIII is preferably effected in such a way that the refractive indices of polymer phase B in the temperature range of the OFF mode are closely similar to those of polymer phase A and the respective matrix plastic. Ideally, polymer phase B and the matrix plastic have the same monomer composition. The polymer phase B and the matrix plastic are then to be considered a single phase, so that only one phase interface exists between the particle core (polymer phase A) and particle shell (polymer phase B). By optimally matching the refractive indices of both phases, a transparency or translucency approximately corresponding to that of the pure matrix plastic can thus be achieved in the temperature range of the OFF mode.

Preferred monomers VI for forming polymer phase B include methyl, ethyl, npropyl, isopropyl, n-butyl, sec-butyl, isobutyl, tert-butyl, n-hexyl, n-octyl, 2-ethylhexyl, n-decyl, isodecyl, cyclohexyl, 4-tert-butylcyclohexyl, isobornyl and dihydrodicyclopentadienyl(meth)acrylates.

As monomers VII, the above mentioned monomers IV may be used.

As monomers VIII, the above mentioned monomers V may be used.

In a preferred embodiment for poly(meth)acrylate molding compositions, polymer phase B is formed by the copolymerization of from 80 to 99.99% by weight of methyl methacrylate, and from 0.01 to 20% by weight of a $C_1$-$C_8$ alkyl acrylate (monomers VI).

The monomers necessary for forming polymer phase B are added to the aqueous dispersion of polymer phase A after the polymerization of polymer phase A is completed. The monomers are preferably added under such conditions that the formation of new particles is avoided, and the polymer phase B, which forms in this polymerization stage, is deposited as a shell around polymer phase A. Preferably, the monomers are added at the same rate as they are consumed.

Preferably, the monomers necessary for forming polymer phase B are added as an o/w macroemulsion to the aqueous dispersion of polymer phase A. For preparing the o/w macroemulsion, the monomers are mixed with an aqueous surfactant solution, for example, by simple mechanical stirring. The aqueous surfactant solution may additionally contain buffer substances, in order to provide for an advantageous pH of the aqueous phase in view of the free-radical polymerization.

In principle, all the surfactants mentioned above may be used as said surfactants. Preferably, identical surfactants are used for both polymerization stages (polymer phase A and polymer phase B).

The amount of surfactant in the o/w macroemulsion needed for forming the polymer phase B is preferably chosen so that the critical micelle concentration (cmc) of the surfactant in the aqueous phase containing polymer phase A is not exceeded, in order to minimize the risk of new particle formation. As a rule, the amount of surfactant is within a range of from 0.01 to 2% by weight, based on the amount of monomers contained in the o/w macroemulsion.

Preferably, water-soluble free-radical polymerization initiators are used for forming the polymer phase B. Suitable initiators include the water-soluble free-radical polymerization initiators mentioned above.

The addition of the water-soluble free-radical polymerization initiator may be done at once or over an extended period of time during the polymerization of polymer phase B. Alternatively, part of the polymerization initiator may be added at once, and the remaining part metered over an extended period of time. Preferably, the water-soluble free-radical polymerization initiator is continuously metered together with the o/w macroemulsion, either jointly or through a separate feed.

Usually, from 0.01 to 1% by weight of free-radical polymerization initiator is employed, based on the amount of monomers to be polymerized.

If water-soluble polymerization initiators are used already in the first polymerization stage when the polymer phase A is formed, and these are still available for forming polymer phase B in sufficient amounts during the second polymerization stage, the further addition of water-soluble polymerization initiators can often be dispensed with.

The proportion of monomer phase B in the total weight of the o/w macroemulsion to be metered is from 10 to 80% by weight, preferably from 25 to 70% by weight, especially from 35 to 60% by weight.

The reaction times for forming the polymer phase B after the addition of monomers is complete are usually from 0.25 to 8 hours, mostly from 0.5 to 4 hours.

Subsequently to the actual free-radical polymerization reaction, it is often advantageous to free the resulting particle dispersion largely from residual monomers and other volatile organic components. This can be effected, for example, by steam distillation or by stripping with an inert gas. Further, the content of residual monomers can also be reduced by free-radical postpolymerization, which can be initiated, for example, by adding the redox initiator systems mentioned above. Further suitable methods are described, for example, in P. H. H. Araujo et al., Techniques for Reducing Residual Monomer Content in Polymers: A Review, Polymer Engineering and Science, July 2002, 42 (7), pp. 1442-1468.

Optionally, from 0 to 2% by weight of a molecular weight regulator may be added in the polymerization of the respective polymer phase. The molecular weight regulator will be part of the respective polymer phase. Molecular weight regulators limit the length of polymer chains. In this way, the molecular weight of the polymer phase can be matched to that of the subsequent phase or of the matrix plastic.

For example, $C_1$-$C_{18}$ alkanethiols, such as 2-ethylhexane-, 1-dodecane- and 1-octadecane thiols, are suitable as molecular weight regulators.

After completion of the polymerization, the polymer particles according to the invention are obtained in the form of an aqueous dispersion with a solids content of typically from 20 to 50% by weight. The polymer particles according to the invention can be recovered from the aqueous dispersion, for example, by spray drying. However, this method has the disadvantage that the water-soluble polymerization aids are not separated off.

Therefore, in a preferred embodiment of the process, the polymer particles according to the invention are recovered by a sequence of precipitation/coagulation, filtration, washing and drying. Since direct filtration of the dispersion is usually very time-consuming because of the small size of primary particles of the polymer particle according to the invention, the primary particles are precipitated/coagulated before the filtration. A number of different methods are known for this purpose. Thus, for example, dispersions can be coagulated by the addition of strong electrolytes. In salt coagulation, salts containing polyvalent cations, such as $Ca^{2+}$, $Mg^{2+}$or $Al^{3+}$, are usually employed. Further, methods are known that initiate coagulation of polymer dispersions without the addition of salts, for example, the application of high shear forces (shear precipitation), or freezing (freeze-coagulation).

In another preferred method for the isolation of the polymer particles according to the invention, special extrusion methods are applied in which coagulation, dehydration and degassing are effected by means of a screw extruder in only one operation (see, e.g., DE 2917321). In this method, the water phase is separated off without leaving disturbing amounts of residues of the water-soluble non-volatile components. The polymer is obtained as a molten strand, which may subsequently be pelletized. These methods additionally offer the possibility to mix a polymer directly with a molding composition as a matrix plastic, so that another operation could be omitted.

The primary particle mean diameters of the polymer particles according to the invention are selected from a range of 50 nm to 10 µm, preferably 100 to 2000 nm, more preferably 200 to 1000 nm. Particle diameters in this size range are determined, for example, by laser diffraction. The d50 value is stated as a mean primary particle diameter. d50 means that 50% by weight of the particles are smaller, and 50% by weight of the particles are larger that the stated value. Primary particles means that aggregations/adhesions of the particles among each other are disrupted before the size is measured.

The polymer particles according to the invention may further contain from 0 to 10% by weight of inorganic nanoparticles. Particularly suitable nanoparticles include silicates and oxides of the elements Al, Si, Zr, Hf, Ti, Zn, Pb, and possible mixed oxides thereof. Preferably, the particle size of these inorganic nanoparticles is within a range of from 5 to 50 nm. Because of such doping, an extended temperature stability is observed in the polymer particles according to the invention.

The invention also relates to a plastic that contains, based on its total weight:
A) from 1 to 80% by weight of the polymer particles according to the invention;
B) from 20 to 99% by weight of a matrix, consisting of
  i) from 50 to 100% by weight of at least one transparent or translucent matrix plastic; and
  ii) from 0 to 50% by weight of other additives.

Such a plastic is a thermotropic plastic or molding composition, which reversibly changes its light transmission when the temperature changes.

When formed into a plastic plate or film within a layer thickness of 2 mm, the plastic exhibits a change of the total light transmittance according to DIN EN 410 of at least 5%, based on the maximum total light transmittance of the plastic plate of film, within a temperate range of from −20 to 150° C.

Particularly suitable matrix materials include plastic polymers, such as poly(meth)acrylates, polycarbonates, polyolefins, polystyrenes, and mixtures thereof. Examples of suitable substances include polyethylene standard homo and copolymers (e.g., PE-LD, PE-HD), cross-linked polyethylene derivatives (e.g., PE-X), ethylene copolymers (PE-ULD, PE-VLD, EVA, EVOH, EBA, EEAK, EMA, EAMA, COC, EIM), polypropylenes (PP), polystyrenes (PS), polystyrene copolymers (e.g., ABS, SAN), polyvinyl chlorides (PVC), polyvinyl butyrals (PVB), transparent polyamides (PA), polycarbonates (PC), and transparent PC blends, polyethylene terephthalate (PET), and transparent PET blends, polyethylene naphthalate (PEN), polyarylsulfones (PSU), polyethersulfones (PES), transparent cellulose derivatives (CA, CAB, CAP), and preferably polymethacrylate homo and copolymers or high impact resistance modifications (PMMA, AMMA, MBS, MABS, PMMI, PMMA-HI).

Common transparent or translucent molding compositions as used for thermoplastic processing are suitable as a matrix plastic. They are selected from the group of polyethylene standard homo- and copolymers (e.g., PE-LD, PE-HD), ethylene copolymers (PE-ULD, PE-VLD, EVA, EVOH, EBA, EEAK, EMA, EAMA, COC, EIM), polypropylenes (PP), styrene polymers (PS, ABS, SAN), polyvinyl chlorides (PVC), polyvinyl butyral (PVB), thermoplastic polyurethanes (TPU), polymethacrylate homo- and copolymers, or high impact resistance modifications (PMMA, AMMA, MBS, MABS, PMMI, PMMA-HI), polyamides (PA), polycarbonates (PC), and PC blends, polyesters of terephthalic acid (PET, PBT) and blends, polyarylsulfones (PSU), polyethersulfones (PES), and cellulose derivatives (CA, CAB, CAP).

Particularly suitable transparent or translucent molding compositions from these groups include poly(methyl methacrylate) (PMMA), high impact resistant variants of PMMA (PMMA-HI), methyl methacrylate copolymers (AMMA), polymethacrylmethylimide (PMMI), transparent polyamides (PA) based on aromatic dicarboxylic acids or branched aliphatic or acyclic diamines, transparent polyamides (PA) based on dodecanedioic acid and a cycloaliphatic diamine, polycarbonate (PC) based on bisphenol A, polyethylene terephthalate (PET), polystyrene (PS), polyvinyl butyral (PVB), and thermoplastic polyurethane (TPU).

The measuring method described in the Examples is employed to determine the transparency of the matrix material.

The thermotropic plastic can be prepared in a particularly simple way by mixing the polymer particles according to the invention with the molding composition as a matrix plastic and optionally further additives by compounding, for example, in an extruder or kneader.

The resulting thermotropic molding composition can be formed with the usual methods for forming thermoplasts, such as extrusion, calendering, extrusion blow molding, injection molding, injection-compression molding, injection blow molding, and compression molding, into arbitrary molded parts, such as solid plates, multi-skin sheets, corrugated sheets, films, rods, tubes, or the like.

In addition to thermoplastic molding compositions, other transparent or translucent plastics may also be used as a matrix plastic. These include, in particular, curable molding compositions, and curable casting and laminating resins. In both cases, the resins are reactive resins that are cured by adding chemical curing agents, by UV radiation or electron beams, or by higher temperatures. Suitable reactive resins for preparing thermotropic plastics include, in particular, transparent or translucent formaldehyde resins, unsaturated polyester resins, epoxide resins, silicone resins, diallyl phthalate resins, and diallyl diglycol carbonate.

For the preparation of thermotropic PMMA, in addition to thermoplastic processing with PMMA molding compositions (acrylic glass XT), the so-called casting method (acrylic glass GS) may also be applied (DE 639095, see also Ullmann's Encyclopedia of Industrial Chemistry, Polymethacrylates, Wiley-VCH Verlag GmbH & Co. KGaA, Weinheim, 2013, DOI: 10.1002/14356007.a21_473. pub2). The casting method is of importance, in particular, when products with a high optical quality, mirror finish and a high thickness are demanded. As a precursor of thermotropic acrylic glass GS, a mixture of PMMA, methyl methacrylate (MMA), the polymer particles according to the invention, a thermal polymerization initiator and optionally further additives, such as (cross-linking) comonomers, stabilizers etc., is preferably used. The polymerization is typically effected in a sealed flat chamber consisting of two glass sheets with flawless surfaces, and a spacer. For polymerization, the filled flat chamber, in a horizontal or vertical position, is heated at a temperature program adapted to the conversion within a range of 20 to 60° C. for several hours. The final polymerization is effected at temperatures of 110 to 130° C. Alternatively, thermotropic acrylic glass may also be prepared by a continuous casting method, such as the dual belt method (U.S. Pat. No. 3,376,371).

In principle, the thermotropic molding composition may contain further ingredients, for example, glidants, antiblocking agents, mold-release agents, stabilizers (antioxidants, light stabilizers, thermal stabilizers), antistatic agents, flame retardants, colorants, impact modifiers, plasticizers, adhesion promoters, fillers, enhancers, blowing agents, etc., and mixtures thereof.

In a particularly simple way, the molding composition can be prepared by mixing the particles according to the invention with the matrix by compounding, for example, in an extruder or kneader.

The thermotropic plastics according to the invention may of course also be used for preparing composite materials. Thus, the thermotropic plastic is bonded to further materials, such as glass, plastic, wood, metal and the like, so that composite materials are obtained, such as, for example, laminated sheets, laminated glasses, glasses coated with a thermotropic adhesive sheet or a thermotropic lacquer. Depending on the matrix plastic, the common methods can be applied for this purpose, such as coextrusion, multicomponent injection molding, adhesive bonding, laminating, casting, spraying, knife coating, flow coating, and the like.

The molding composition according to the invention may then be used for the preparation of final products, for example, by extrusion or injection molding, to obtain molded parts, such as solid plates, multi-skin sheets, corrugated sheets, films, tubes, or the like.

These molded parts obtainable therefrom are suitable, for example, as overheating protection and glare protection in winter gardens, greenhouses, carports, or in the glazing of buildings.

The thermotropic plastics and the thermotropic molded parts or plastic parts prepared therefrom are suitable, for example, for glazings of buildings, vehicles, winter gardens, greenhouses; for glass facades, glass facade elements and curtain walls; for solar glass and light-directing solar glass; for insulating glass, heat-protection glass, and insulating plates; for laminated glass, safety glass, and laminated sound insulating glass; for carports, balcony glazing, terrace roofing, glass houses, indoor swimming pool glazings and roofings; for roof, overhead and fanlight glazing; for industrial glazing; for transparent construction elements, skylight domes, continuous rooflights and barrel vaults; for profiled glass, hollow chamber plates, and panels; for transparent heat insulation; as covers for solar collectors and photovoltaic modules; for sun protection films and lacquers; for agricultural and greenhouse films; as a laminating film for, for example, laminated glass; for indoor glazing, partition walls, room dividers, shower cabinets, glass doors and sliding glass doors; for decorative glass; for luminaire covers, lampshades, reflectors and optical waveguides; for optical lenses and eyeglass lenses or their coatings; for luminous advertising and neon signs; for traffic signs and sign boards, and for packaging.

Figure 1:
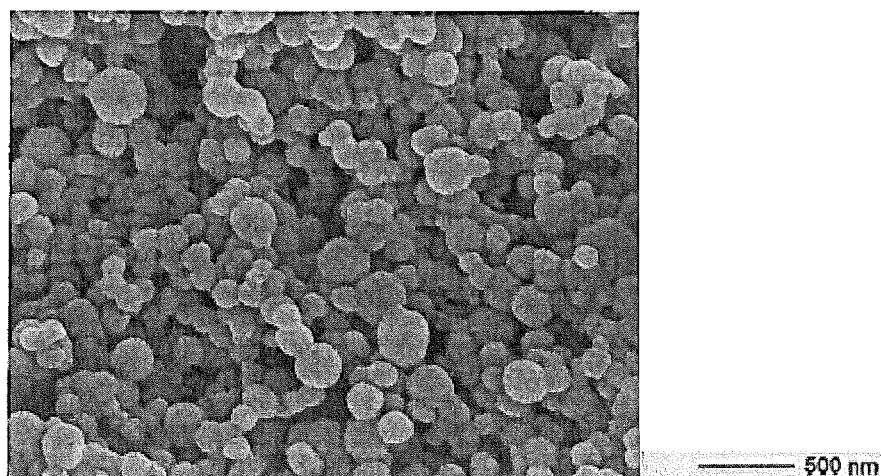
FIG. 1 shows a scanning electron micrograph of the coagulated dry polymerizate from Example 1. The mean primary particle diameter d50 of the polymerizate is within a range of from 100 to 400 nm.

The invention is further illustrated by means of the following Examples.

EXAMPLE 1

Preparation of the Polymer Particles According to the Invention

For Example 1, polymer particles according to the invention were prepared, which can be used as a thermotropic additive for poly(methyl methacrylate) (PMMA) as a matrix plastic. They are suitable for both thermoplastic processing with commercial PMMA molding compositions (acrylic glass XT, Examples 6 and 7), and for the preparation of PMMA castings (acrylic glass GS, Examples 8 and 9). The two-phase polymer particles according to the invention consist of the polymer phases A and B at a weight ratio of A/B=75/25% by weight (based on the amounts of monomers employed). Polymer particles according to the invention that consist of only one polymer phase A are usually unsuitable for thermoplastic processing with PMMA molding compositions. Because of the mostly insufficient compatibility of polymer phase A with PMMA molding compositions, corresponding molded parts often exhibit permanent turbidities, inhomogenities and numerous particle agglomerates as damage pattern.

The monomer composition of both polymer phases is shown in Tables 1 and 2. The composition of polymer phase A was selected in such a way that the related thermotropic PMMA molded parts or castings reversibly change their light transmission mainly within a temperature range of from 30 to 40° C. Quite generally, for a switching temperature of 30 to 40° C., only those monomers I or mixtures of two or more monomers I are suitable whose homo- or copolymers have a phase-transition temperature $T_m$ above the switching temperature, since the $T_m$ is lowered by copolymerization with further monomers from groups II to V. Therefore, ODA was selected as monomer I for polymer phase A. The phase transition temperature of the homopolymer p(ODA), $T_m \approx 50°$ C. (see K. A. O'Leary, D. R. Paul, Physical properties of poly(n-alkyl acrylate) copolymers, Part 1. Crystalline/crystalline combinations, Polymer 2006, 47, pp. 1226-1244), is about 10 to 20 K above the phase transition temperature required for a switching temperature of 30 to 40° C. Therefore, the phase transition temperature of polymer phase A is reduced by copolymerization with BA (monomer II). It is to be kept in mind that the remaining monomers III to V also contribute to the lowering of $T_m$. For the graft cross-linking of both polymer phases A and B, ALMA (monomer III) was incorporated by polymerization. In order to obtain PMMA molded parts or PMMA castings having a high transparency in the temperature range of the OFF mode, the refractive index of polymer phase A was matched to that of the PMMA matrix ($n_D^{20}$=1.49) by copolymerization with styrene. HEMA (monomer V) was incorporated by polymerization as a fifth component of polymer phase A. Thus, the preparation and processing properties of the polymer particles according to the invention could be improved.

For polymer phase B, a composition was selected that typically corresponds to that of commercial PMMA molding compositions. On the one hand, this improves the compatibility of the particles according to the invention with the PMMA matrix; on the other hand, an optimum matching of the refractive indices of polymer phase B and the matrix plastic can thus be achieved, which decisively improves the transparency in the OFF mode. For the preparation of commercial PMMA molding compositions, small amounts of acrylates (e.g., EA) were mostly used as comonomers, which provide the molding composition a good processability and a higher thermal stability, in addition to MMA as a main monomer.

Starting Materials

TABLE 1

| Monomer phase A for forming the polymer phase A | | | |
|---|---|---|---|
| Substance | Mass [g] | Proportion [% by weight][1] | Monomer[2] |
| ODA | 48.00 | 80.0 | I |
| BA | 4.20 | 7.0 | II |
| ALMA | 2.40 | 4.0 | III |
| Styrene | 3.00 | 5.0 | IV |
| HEMA | 2.40 | 4.0 | V |

[1]based on monomer phase A
[2]according to the classification according to the invention For the free-radical polymerization of monomer phase A, 0.60 g of LPO was used as an oil-soluble polymerization initiator.

The related aqueous phase A is composed of 0.30 g of SDS, 0.075 g of NaHCO$_3$, and 140 g of ultrapure water.

TABLE 2

| Monomer phase B for forming the polymer phase B | | | |
|---|---|---|---|
| Substance | Mass [g] | Proportion [% by weight][1] | Monomer[2] |
| MMA | 19.20 | 96 | VI |
| EA | 0.80 | 4 | VI |

[1]based on monomer phase B
[2]according to the classification according to the invention The related aqueous phase B is composed of 0.020 g of SDS, 0.010 g of NaHCO$_3$, 0.020 g of NaPDS, and 20 g of ultrapure water.

Equipment

Ultrasonic homogenization: HIELSCHER Ultrasonic reactor UP200S with Sonotrode S14 and the settings Amplitude 100% and Cycle 1.

Metering pump: HEIDOLPH Pump drive PD 5101, Pump head SP QUICK D 1,6, TYGON 2001 flexible tube 0.8/1.6, metering at Stage 10.

Vacuum filtration: Filter MACHERY-NAGEL MN 640 W (moderately fast, 150 mm diameter), plastic frit (150 mm diameter), 1000 ml filter flask, membrane pump.

Procedure

An aqueous phase A temperature-controlled to 35° C. was charged first. In a circulating air drying cabinet, monomer I was melted completely at 60° C. Monomers II to V were previously warmed up in a water bath (35° C.) and combined with the liquid monomer I with magnetic stirring. The resulting monomer phase A was kept at 35° C. for another 15 min with continuous stirring. Immediately before the combination of monomer phase A and aqueous phase A, the oil-soluble initiator was added to monomer phase A, and completely dissolved with magnetic stirring. The combined phases were predispersed to an o/w macroemulsion by vigorous stirring with a magnetic stirrer at 35° C. for 10 min. Subsequently, the o/w macroemulsion was homogenized with ultrasound for 30 min to an o/w miniemulsion. During the ultrasonic treatment, the mixture was cooled with a water bath (25° C.), and the interior temperature was monitored. In addition, the emulsion was stirred with a magnetic stirrer to ensure an essentially uniform temperature distribution. During the ultrasonic treatment, the interior temperature was within a range of from 30 to 45° C. After the ultrasonic treatment, the o/w miniemulsion was transferred into a polymerization vessel preheated at 35° C. A 500 ml three-necked flask with a reflux condenser, inert gas inlet and precision glass stirrer was used as the polymerization vessel. The revolutions per minute of the precision glass stirrer was set to 300 rpm by means of an electronic stirrer. A temperature-regulated oil bath with a stirring hot plate was used to heat the polymerization vessel. Magnetic stirring provided for a uniform temperature distribution in the oil bath. The o/w miniemulsion was degassed at an oil bath temperature of 35° C. and with stirring under a flow of inert gas (argon) for 15 min. The flow of inert gas was reduced, and the miniemulsion heated at 85° C. Subsequently, polymerization was performed for another 120 min at 85° C. with a constant number of revolutions. During the two-hour polymerization time of polymer phase A, the o/w macroemulsion for polymer phase B was prepared. Thus, the monomer phase B was combined with the aqueous phase B, and stirred vigorously with a magnetic stirrer for 30 min. After the end of the two-hour polymerization time of polymer phase A, the resulting o/w macroemulsion was added dropwise over a period of 45 min using a metering pump at 85° C. After the addition was complete, stirring was continued for 120 min at 85° C. and with a constant number of revolutions. Subsequently, the oil bath was removed, and the particle dispersion coagulated. For this purpose, the dispersion was transferred in to a beaker while still warm, and admixed with 150 ml of a 0.5% magnesium sulfate solution with vigorous stirring with a magnetic stirrer. The coagulate was filtered under vacuum conditions. The remaining filter residue was washed another five times with 250 ml of water each, to remove all water-soluble polymerization aids completely if possible. The wet polymerizate was dried under a hood until its mass remained constant to obtain 73.4 g of a colorless solid.

Particle Analytics

The dry polymerizate from Example 1 was characterized by differential scanning calorimetry using a PERKIN ELMER DSC 4000. Two heating curves and one cooling curve were recorded in a temperature range of from −20 to 120° C. and with a heating or cooling rate of 10 K/min (sequence: heating curve 1, cooling curve 1, heating curve 2). Cooling curve 1 and heating curve 2 were employed for evaluation. A first order phase transition is found. Cooling curve 1: onset temperature=34.4° C., peak temperature=30.3° C., delta H=−39.2 J/g; heating curve 2: onset temperature=30.7° C., peak temperature=39.0° C., delta H=39.4 J/g.

FIG. 1 shows a scanning electron micrograph of the coagulated dry polymerizate from Example 1. The mean primary particle diameter d50 of the polymerizate is within a range of from 100 to 400 nm.

In the following Examples 2 to 5, the preparation of other polymer particles according to the invention with different phase transition temperatures is documented.

EXAMPLE 2

Preparation of the Polymer Particles According to the Invention

Starting Materials

TABLE 3

| Monomer phase A for forming the polymer phase A | | | |
|---|---|---|---|
| Substance | Mass [g] | Proportion [% by weight][1] | Monomer[2] |
| DCA | 42.00 | 70.0 | I |
| BA | 12.60 | 21.0 | II |
| ALMA | 2.40 | 4.0 | III |
| HEMA | 3.00 | 5.0 | V |

[1]based on monomer phase A
[2]according to the classification according to the invention For the free-radical polymerization of monomer phase A, 0.30 g of AIBN was used as an oil-soluble polymerization initiator.

The related aqueous phase A is composed of 0.30 g of SDS, 0.075 g of $NaHCO_3$, and 140 g of ultrapure water.

TABLE 4

| Monomer phase B for forming the polymer phase B | | | |
|---|---|---|---|
| Substance | Mass [g] | Proportion [% by weight][1] | Monomer[2] |
| MMA | 19.00 | 95 | VI |
| EA | 1.00 | 5 | VI |

[1]based on monomer phase B
[2]according to the classification according to the invention The related aqueous phase B is composed of 0.020 g of SDS, 0.010 g of $NaHCO_3$, 0.020 g of NaPDS, and 20 g of ultrapure water.

Procedure

The procedure was analogous to Example 1, with the following changes:

Monomer I was melted completely in a circulating air drying cabinet at 80° C.

The aqueous phase A, the monomer phase A and the o/w macroemulsion prepared from both phases were controlled to a temperature of 45° C. During the ultrasonic treatment, the emulsion was cooled with a water bath (35° C.). The interior temperature was within a range of from 40 to 55° C. After the ultrasonic treatment, the o/w miniemulsion was transferred into a polymerization vessel preheated at 45° C.

The polymerization initiator AIBN needed for forming the polymer phase A was added to the o/w miniemulsion at 45° C. only after the ultrasonic treatment.

71.9 g of a colorless solid was obtained.

Particle Analytics

The particle analytics were performed using DSC by analogy with Example 1. Heating curve 2 was employed for evaluation. A first order phase transition is found. Heating curve 2: onset temperature=46.5° C., peak temperature=52.8° C., delta H=47.5 J/g.

EXAMPLE 3

Preparation of the Polymer Particles According to the Invention

Starting Materials

TABLE 5

| Monomer phase A for forming the polymer phase A | | | |
|---|---|---|---|
| Substance | Mass [g] | Proportion [% by weight][1] | Monomer[2] |
| ODA | 27.00 | 45.0 | I |
| HDA | 27.00 | 45.0 | I |
| ALMA | 2.40 | 4.0 | III |
| BzMA | 1.20 | 2.0 | IV |
| HPA | 2.40 | 4.0 | V |

[1]based on monomer phase A
[2]according to the classification according to the invention For the free-radical polymerization of monomer phase A, 0.60 g of LPO was used as an oil-soluble polymerization initiator.

The related aqueous phase A is composed of 0.30 g of SDS, 0.075 g of NaHCO$_3$, and 140 g of ultrapure water.

TABLE 6

| Monomer phase B for forming the polymer phase B | | | |
|---|---|---|---|
| Substance | Mass [g] | Proportion [% by weight][1] | Monomer[2] |
| MMA | 19.20 | 96 | VI |
| EA | 0.80 | 4 | VI |

[1]based on monomer phase B
[2]according to the classification according to the invention The related aqueous phase B is composed of 0.020 g of SDS, 0.010 g of NaHCO$_3$, 0.020 g of NaPDS, and 20 g of ultrapure water.

Procedure

The procedure was analogous to Example 1, with the following changes:

Both monomers I were melted completely together in a circulating air drying cabinet at 60° C.

After the polymerization, the particle dispersion was coagulated by freezing. For this purpose, the particle dispersion was stored in a freezer at −18° C. for 24 hours. After thawing, the coagulate was filtered, washed and dried analogously to Example 1.

75.2 g of a colorless solid was obtained.

Particle Analytics

The particle analytics were performed using DSC by analogy with Example 1. Heating curve 2 was employed for evaluation. A first order phase transition is found. Heating curve 2: onset temperature=30.9° C., peak temperature=37.3° C., delta H=48.7 J/g.

EXAMPLE 4

Preparation of the Polymer Particles According to the Invention

Starting Materials

TABLE 7

| Monomer phase A for forming the polymer phase A | | | |
|---|---|---|---|
| Substance | Mass [g] | Proportion [% by weight][1] | Monomer[2] |
| DCA | 54.00 | 90.0 | I |
| ALMA | 2.40 | 4.0 | III |
| HPA | 3.60 | 6.0 | V |

[1]based on monomer phase A
[2]according to the classification according to the invention For the free-radical polymerization of monomer phase A, 0.60 g of BPO (75%, in water) was used as an oil-soluble polymerization initiator.

The related aqueous phase A is composed of 0.30 g of SDS, 0.075 g of NaHCO$_3$, and 140 g of ultrapure water.

TABLE 8

| Monomer phase B for forming the polymer phase B | | | |
|---|---|---|---|
| Substance | Mass [g] | Proportion [% by weight][1] | Monomer[2] |
| MMA | 12.30 | 82 | VI |
| Styrene | 2.70 | 18 | VII |

[1]based on monomer phase B
[2]according to the classification according to the invention The related aqueous phase B is composed of 0.015 g of SDS, 0.0075 g of NaHCO$_3$, 0.015 g of NaPDS, and 15 g of ultrapure water.

Thus, the weight ratio of polymer phases A and B is A/B=80/20 by weight (based on the amounts of monomers employed).

Procedure

The procedure was analogous to Example 1, with the following changes:

Monomer I was melted completely in a circulating air drying cabinet at 80° C.

The aqueous phase A, the monomer phase A and the o/w macroemulsion prepared therefrom were controlled to a temperature of 50° C. During the ultrasonic treatment, the emulsion was cooled with a water bath (40° C.). The interior temperature was within a range of from 40 to 60° C. After the ultrasonic treatment, the o/w miniemulsion was transferred into a polymerization vessel preheated at 50° C.

The polymerization initiator BPO needed for forming the polymer phase A was added to the o/w miniemulsion at 50° C. only after the ultrasonic treatment.

The o/w macroemulsion of monomer phase B was added dropwise over a period of 35 min.

67.9 g of a colorless solid was obtained.

Particle Analytics

The particle analytics were performed using DSC by analogy with Example 1. Heating curve 2 was employed for evaluation. A first order phase transition is found. Heating curve 2: onset temperature=58.8° C., peak temperature=63.7° C., delta H=67.8 J/g.

EXAMPLE 5

Preparation of the Polymer Particles According to the Invention

Starting Materials

TABLE 9

Monomer phase A for forming the polymer phase A

| Substance | Mass [g] | Proportion [% by weight][1] | Monomer[2] |
|---|---|---|---|
| DCA | 33.00 | 55.0 | I |
| ODA | 22.20 | 37.0 | I |
| ALMA | 2.40 | 4.0 | III |
| HPA | 2.40 | 4.0 | V |

[1]based on monomer phase A
[2]according to the classification according to the invention For the free-radical polymerization of monomer phase A, 0.30 g of AIBN was used as an oil-soluble polymerization initiator.

The related aqueous phase A is composed of 0.30 g of SDS, 0.075 g of $NaHCO_3$, and 140 g of ultrapure water.

TABLE 10

Monomer phase B for forming the polymer phase B

| Substance | Mass [g] | Proportion [% by weight][1] | Monomer[2] |
|---|---|---|---|
| MMA | 19.60 | 98 | VI |
| BA | 0.40 | 2 | VI |

[1]based on monomer phase B
[2]according to the classification according to the invention The related aqueous phase B is composed of 0.020 g of SDS, 0.010 g of $NaHCO_3$, 0.020 g of NaPDS, and 20 g of ultrapure water.

Procedure

The procedure was analogous to Example 1, with the following changes:

Monomer I was melted completely in a circulating air drying cabinet at 80° C.

The aqueous phase A, the monomer phase A and the o/w macroemulsion prepared therefrom were controlled to a temperature of 50° C. During the ultrasonic treatment, the emulsion was cooled with a water bath (40° C.). The interior temperature was within a range of from 40 to 60° C. After the ultrasonic treatment, the o/w miniemulsion was transferred into a polymerization vessel preheated at 50° C.

The polymerization initiator AIBN needed for forming the polymer phase A was added to the o/w miniemulsion at 50° C. only after the ultrasonic treatment.

76.1 g of a colorless solid was obtained.

Particle Analytics

The particle analytics were performed using DSC by analogy with Example 1. Heating curve 2 was employed for evaluation. A first order phase transition is found. Heating curve 2: onset temperature=48.3° C., peak temperature=52.8° C., delta H=57.1 J/g.

EXAMPLE 6

Thermotropic PMMA Molding Composition and Molded Part

For preparing a thermotropic molding composition according to the invention, the polymer particles from Example 1 were mixed in a molten state with an impact modified PMMA molding composition (LUCITE DIAKON CLH952 and IM 9386 at a ratio of 60 to 40% by weight) at temperatures of from 220 to 250° C. For mixing in a molten state, a 10-zone twin-screw extruder (COPERION ZSK 18) was used. The hot compound strand of the thermotropic PMMA molding composition is intensively white and turbid when it leaves the extruder nozzle. After cooling to room temperature, it clears up visibly. The cold compound strand was subsequently pelletized.

The pelletized compound was subsequently processed further on an automated injection molding machine (ENGEL VIKTORY 200/50 Focus) at temperatures of 240 to 260° C. to form solid plates of dimensions 60×60×2 mm.

EXAMPLE 7

Thermotropic PMMA Molding Composition and Molded Part

For preparing a thermotropic molding composition according to the invention, polymer particles with identical compositions were mixed in a molten state with the impact modified PMMA molding composition PLEXIGLAS zk4HC (EVONIK) at temperatures of from 210 to 250° C. For mixing in a molten state, a twin-screw desk-top compounder with a pair of co-rotating screws (COLLIN ZK 25 T, TEACH-LINE) was used. After cooling to room temperature, the compound strand was pelletized.

The pelletized compound was processed further with a laboratory plate press (COLLIN P 200 M) to form a solid plate of dimensions 50×50×4 mm. The pellets were spread between two Kapton protective films in the cavity of a compression frame, and subsequently compression-molded between two chrome-plated and mirror-finished brass plates at a temperature of 220° C. and under a pressure of 200 bar.

EXAMPLE 8

Thermotropic PMMA Solid Plate Prepared by the Casting Method

For preparing a cast PMMA solid plate (acrylic glass GS) having thermotropic properties according to the invention, the industrial flat chamber method in a simplified set-up was used. A simple chamber formed from two float glass sheets (100×100×5 mm), a 3 mm thick PVC string as a spacer and four foldback clamps served for polymerization on a laboratory scale. A prepolymer consisting of 10% by weight of the molding composition PLEXIGLAS 7N and 90% by weight of the monomer MMA was used as a PMMA precursor. A mixture of 15% by weight of the polymer particles according to the invention and 85% by weight of prepolymer was mixed with a magnetic stirrer with a high number of revolutions for 60 min to form a homogeneous particle/prepolymer dispersion. Subsequently, 0.2% by weight (based on the total weight of the particle/prepolymer dispersion) of the polymerization initiator LPO was added with stirring. Stirring was continued for another 10 min. The resulting thermally curable particle/prepolymer dispersion was filled into the chamber and heated at 58° C. in a vertical position in a circulating air drying cabinet for 16 hours for polymerization. The final polymerization was performed at 110° C. for 2 hours. Subsequently, the thermotropic PMMA solid plate was isolated from the chamber. It has a layer thickness of 2.9 mm.

EXAMPLE 9

Thermotropic PMMA Solid Plate Prepared by the Casting Method

The procedure was analogous to Example 8, except that a PVC string with a diameter of 5 mm was used as the spacer for the chamber. The layer thickness of the thus prepared thermotropic PMMA solid plate was 4.6 mm.

Optical Characterization of Examples 6 to 9

Figure 2:
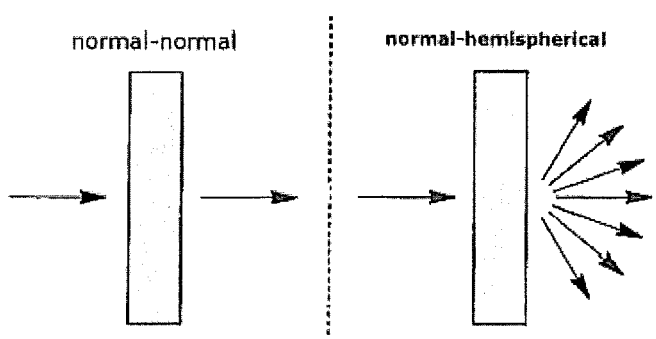
FIG. 2 shows two measuring set-ups employed for the optical characterization of specimens.

The injection-molded PMMA part (Example 6), the compression-molded PMMA part (Example 7) and the two cast PMMA solid plates (Examples 8 and 9) were characterized optically by temperature-dependent measurements of the transmittance in the wavelength range of the solar spectrum (280-2500 nm). FIG. 2 shows both measuring set-ups employed for the optical characterization of specimens. In both cases, the incident beam hits the test specimen at a right angle. If only the directional portion of the radiation at an exit angle of 90° is detected, this is called normal-normal transmittance ($T_{nn}$). In contrast, in a normal-hemispheric transmittance measurement ($T_{nh}$), the entire forwardscattered (diffuse) radiation is detected in addition to the directional portion. Thus, the normal-hemispheric transmittance indicates the total transmittance of the test specimen.

All the transmittance measurements were performed with a two-beam spectrophotometer from the company JASCO (V-670). For normal-hemispheric measurements, a 60 mm Ulbricht integrating sphere with a solid sample holder from the company JASCO was used.

The test specimens were equilibrated at the respective temperature in a thermostatically controllable sample holder for at least 20 min. The OFF mode was measured at 25° C., and the ON mode was measured at 85° C.

The integrated transmittance percentages Tvis and Tsol were calculated from the measured spectra, taking into account the spectral distribution of the visible light (vis) or of the solar radiation (sol) (according to DIN EN 410: Determination of luminous and solar characteristics of glazing, European Standard EN 410, German version, European Committee for Standardization, Brussels, 1998).

An evaluation of the thermotropic switching properties of the specimens was performed on the basis of the following characteristics of radiation transmission: $Tvis_{nn}$, $Tvis_{nh}$=percent normal-normal (nn) or normal-hemispheric (nh) transmittance in the visible wavelength range (380-780 nm), taking into account the spectral brightness sensitivity and the normalized relative spectral radiation distribution of the standard illuminant D65.

$Tsol_{nh}$=percent normal-hemispheric (nh) transmittance in the solar wavelength range (300-2500 nm), taking into account the normalized relative spectral radiation distribution of the global radiation.

$\Delta T_{abs}$=absolute difference of the respective transmittance between the OFF and ON modes as calculated according to $\Delta T_{abs}$=T(OFF)−T(ON).

$\Delta T_{rel}$=relative difference of the respective transmittance between the OFF and ON modes as calculated according to $\Delta T_{rel}$=100−[T(ON)/T(OFF)*100]. Thus, $\Delta T_{rel}$ indicates the percent change in transmittance, based on T(OFF).

TABLE 11

Specimens for optical characterization

| Example | Method | Content[1] | Layer thickness |
|---|---|---|---|
| 6 | Compounding and injection molding | 20% by weight | 2.0 mm |
| 7 | Compounding and compression molding | 20% by weight | 4.0 mm |
| 8 | Casting method | 15% by weight | 2.9 mm |
| 9 | Casting method | 15% by weight | 4.6 mm |

[1]Proportion of the polymer particles according to the invention in the total weight of the specimen, based on the weight proportions employed.

TABLE 12

Results of the normal-hemispheric transmittance measurements at 25° C. (OFF) and at 85° C. (ON)

| Example | $Tvis_{nh}$ (OFF) | $Tvis_{nh}$ (ON) | $\Delta Tvis_{nh}$ abs | $\Delta Tvis_{nh}$ rel | $Tsol_{nh}$ (OFF) | $Tsol_{nh}$ (ON) | $\Delta Tsol_{nh}$ abs | $\Delta Tsol_{nh}$ rel |
|---|---|---|---|---|---|---|---|---|
| 6 | 82% | 56% | 26% | 32% | 79% | 59% | 20% | 25% |
| 7 | 82% | 39% | 43% | 52% | 74% | 40% | 34% | 46% |
| 8 | 89% | 60% | 29% | 33% | 85% | 64% | 21% | 25% |
| 9 | 85% | 42% | 43% | 51% | 81% | 49% | 32% | 40% |

The test specimens of Examples 6 to 9 have a high light transmittance in the OFF mode ($Tvis_{nh}$ (OFF)=82 to 89%). The solar transmittance is only slightly lower ($Tsol_{nh}$ (OFF)=74 to 85%). Increasing the temperature reduces the visible transmittance $Tvis_{nh}$ to from 26 to 43%, and the solar transmittance $Tsol_{nh}$ to from 20 to 34%. The relative changes, based on the transmittance in the OFF mode, are from 32 to 52% in the visible wavelength range, and from 25 to 46% in the solar wavelength range.

Figure 3:
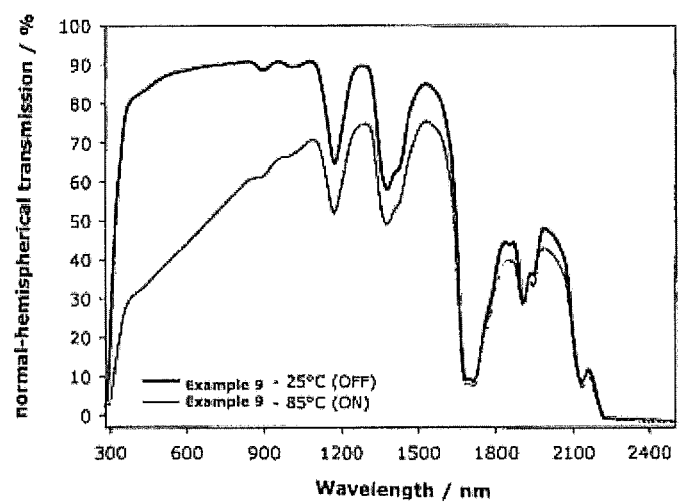
FIG. 3 shows the spectra of the normal-hemispheric transmittance as seen in Example 9.

FIG. 3 shows the related spectra of the normal-hemispheric transmittance for Example 9.

Figure 4:
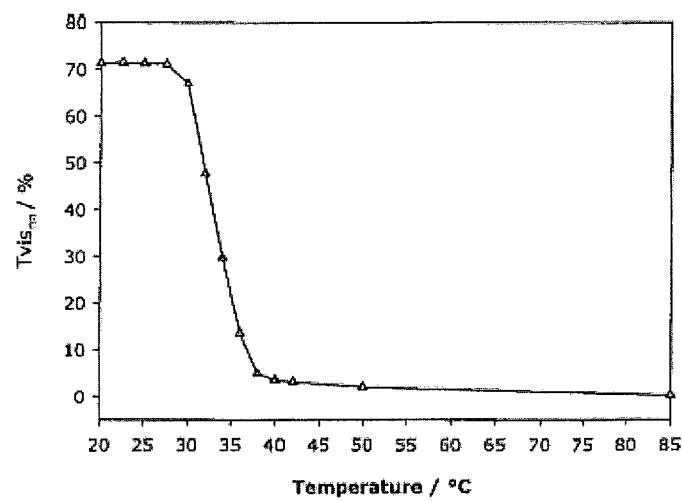
FIG. 4 shows the transmittance of the normal-normal visible transmittance ($Tvis_{nn}$) as calculated from the transmittance spectra, plotted against the temperature.

In addition to the measurements of normal-hemispheric transmittance, the compression-molded PMMA part from Example 7 was characterized by temperature-dependent measurements of normal-normal transmittance. Thus, the test specimen was heated in a thermostatically controllable sample holder directly in the beam path of the spectrometer gradually from 20 to 85° C. At temperatures of 20, 22.5, 25, 27.5, 30, 32, 34, 36, 38, 40, 42, 50 and 85° C., transmission spectra were recorded in a wavelength range of 280-2500 nm. The preheating time was from 15 to 60 min. In FIG. 4, the transmittance values of normal-normal visible transmittance ($Tvis_{nn}$) as calculated from the transmission spectra are plotted against temperature. In the temperature range of the OFF mode (20 to 30° C.), $Tvis_{nn}$ is almost constant. From a specimen temperature of about 30° C., there is onset of thermotropic switching. Then, in a temperature range of from 30 to 40° C., the transmittance decreases significantly by more than 75%. Above 40° C. (ON mode), $Tvis_{nn}$ decreases only slightly.

This Example shows that the largest reduction in transmittance can be observed in the range of the phase transition temperature $T_m$ of the polymer phase A of the particles according to the invention. The clouding occurs within a comparatively narrow temperature window parallel to the specimen temperature. The switching times are short. Upon cooling, the specimen returns to the original transparent state. The clarification occurs with a slight delay at slightly lower temperatures.

ABBREVIATIONS USED IN THE TEXT

AIBN azobis(isobutyronitrile)
ALMA allyl methacrylate

BA n-butyl acrylate
BPO dibenzoyl peroxide
BzMA benzyl methacrylate
DCA n-docosanyl acrylate
EA ethyl acrylate
HDA n-hexadecyl acrylate
HEMA 2-hydroxyethyl methacrylate
HPA hydroxypropyl acrylate (mixture of isomers)
LPO dilauroyl peroxide
MMA methyl methacrylate
$NaHCO_3$ sodium hydrogencarbonate
NaPDS sodium peroxodisulfate
ODA n-octadecyl acrylate
SDS sodium dodecylsulfate All quoted documents are included herein by reference in their entirety, unless the disclosure contained therein is in contradiction to the teaching of the invention.

The invention claimed is:

1. A plastic material comprising:
    from 1 to 80% by weight of polymer particles having an average primary particle diameter of
    from 50 nm to 10 μm, comprising, based on their total weight:
    A) from 10 to 100% by weight of an inner core of a polymer phase A formed from a
        i) 30 to 99.9% by weight of one or more mono-ethylenically unsaturated monomers I with at least one $C_{12}$-$C_{48}$ n-alkyl side chain;
        ii) 0 to 60% by weight of one or more mono-ethylenically unsaturated monomers II with at least one $C_1$-$C_{11}$ n-alkyl and/or one $C_3$-$C_{48}$ i-alkyl side chain;
        iii) 0.1 to 20% by weight of one or more monomers III with at least two non-conjugated ethylenic double bonds;
        iv) 0 to 69.9% by weight of one or more (hetero) aromatic, mono-ethylenically
        v) 0 to 40% by weight of one or more other mono-ethylenically unsaturated
    B) from 0 to 90% by weight of an outer shell of a polymer phase B, grafted onto the polymer phase A, formed from a monomer mixture comprising
        i) 0 to 100% by weight of one or more monomers VI from the group of $C_1$-$C_{10}$alkyl (meth)acrylates;
        ii) 0 to 100% by weight of one or more (hetero) aromatic mono-ethylenically
        iii) 0 to 50% by weight of one or more other mono-ethylenically unsaturated
        wherein the weight percentages of the monomer mixtures employed in the respective steps add up to 100% by weight;
    wherein the polymer particles are a one-phase polymer particle of the polymer phase A or a two-phase polymer particle having the polymer phase A and the polymer phase B; and
    wherein said polymer particles exhibit a first order phase transition in a temperature range of from −20 to 150° C.; and
    from 20 to 99% by weight of a matrix, comprising
        i. from 50 to 100% by weight of at least one matrix plastic; and
        ii. from 0 to 50% by weight of other additives,
    wherein the plastic material when formed into a plastic plate or film within a layer thickness of 2 mm exhibits a change of the total light transmittance according to DIN EN 410 of at least 5%, based on the maximum total light transmittance of the plastic plate or film, within a temperature range of from −20 to 150° C.

2. The plastic material according to claim 1, wherein the monomers I are selected from the group Ia) of esters of α,β-ethylenically unsaturated $C_3$-$C_4$ carboxylic acids and $C_{12}$-$C_{48}$ n-alkanols; Ib) of the mono- and dialkyl esters of α,β-ethylenically unsaturated $C_4$-$C_6$ dicarboxylic acids with at least one $C_{12}$-$C_{48}$ n-alkyl side chain as an ester radical; and Ic) of the allyl and vinyl esters of C13-C49 n-alkanoic acids.

3. The plastic material according to claim 1, wherein said monomers II are selected from the group IIa) of esters of α,β-ethylenically unsaturated $C_3$-$C_4$ carboxylic acids and $C_1$-$C_{11}$ n-alkanols or $C_3$-$C_{48}$ i-alkanols, IIb) of mono- and diesters of α,β-ethylenically unsaturated $C_4$-$C_6$ dicarboxylic acids, and $C_1$-$C_{11}$ n-alkanols and/or $C_3$-$C_{48}$ i-alkanols, and IIc) the allyl and vinyl esters of $C_2$-$C_{12}$ n-alkanoic acids, and $C_4$-$C_{49}$ i-alkanoic acids.

4. The plastic material according to claim 1, wherein the proportion of polymer phase B in the total particle weight is 0% by weight, and the monomers III are selected from the group of IIIa) the (meth)acrylic acid esters of polyhydric alcohols, IIIb) the vinyl and allyl ethers of polyhydric alcohols, and IIIc) (hetero)cyclic and (hetero)aromatic compounds disubstituted or polysubstituted with allyl, vinyl or (meth)acrylic groups.

5. The plastic material according to claim 1, wherein the proportion of polymer phase B in the total particle weight is more than 0% by weight, and the monomers III are selected from the group of allyl, methallyl and crotyl esters of α,β-ethylenically unsaturated carboxylic acids and dicarboxylic acids.

6. The plastic material according to claim 1, wherein said monomers IV are selected from the group IVa) of vinyl (hetero)aromatics and IVb) of (hetero)aromatic (meth)acrylates.

7. The plastic material according to claim 1, wherein said monomers V are selected from the group Va) of α,β-ethylenically unsaturated mono- and dicarboxylic acids, Vb) of α,β-ethylenically unsaturated carboxylic anhydrides, Vc) of α,β-ethylenically unsaturated carboxylic acid amides, and Vd) of hydroxy-, alkoxy-, carboxy-, amino-, epoxy-, sulfo-, silyl- and halo-substituted alkyl (meth)acrylates, and heterocyclic (meth)acrylates.

8. The plastic material according to claim 1, wherein said monomers VII are selected from the group IVa) of vinyl (hetero)aromatics and IVb) of (hetero)aromatic (meth)acrylates.

9. The plastic material according to claim 1, wherein said monomers VIII are selected from the group Va) of α,β-ethylenically unsaturated mono- and dicarboxylic acids, Vb) of α,β-ethylenically unsaturated carboxylic anhydrides, Vc) of α,β-ethylenically unsaturated carboxylic acid amides, and Vd) of hydroxy-, alkoxy-, carboxy-, amino-, epoxy-, sulfo-, silyl- and halo-substituted alkyl (meth)acrylates, and heterocyclic (meth)acrylates.

10. The plastic material according to claim 1, wherein said polymer phase B is formed by the copolymerization of from 80 to 99.99% by weight of methyl methacrylate, and from 0.01 to 20% by weight of a $C_1$-$C_8$ alkyl acrylate.

11. The plastic material according to claim 1, wherein the weight proportion of polymer phase B in the total weight of the particles according to the invention is from 5 to 90% by weight, preferably from 10 to 50% by weight, especially from 15 to 35% by weight.

12. The plastic material according to claim 1, wherein said polymer particles contain from 0 to 10% by weight of inorganic particles selected from the group of silicates and oxides of the elements Al, Si, Zr, Hf, Ti, Zn, Pb, and possible mixed oxides thereof.

13. The plastic material according to claim 1, wherein polymer phase A and/or polymer phase B contains from 0 to 2% by weight of a molecular weight regulator selected from the group of $C_1$-$C_{18}$ alkanethiols.

14. The plastic material of claim 1, wherein the inner core of the polymer particles is formed by free-radical copolymerization of an oil-in-water (o/w) miniemulsion and the outer shell, if present, is formed by a subsequent free-radical graft copolymerization onto the inner core.

15. The plastic material of claim 1 wherein the matrix is transparent or translucent.

16. The plastic material according to claim 1, wherein the other addictive is selected from the group consisting of glidant, antiblocking agent, mold-release agent, dispersant, antistatic agent, flame retardent, colorant, impact modifier, plasticizer, adhesion, promoter, filler, enhancer, blowing agent and stabilizer.

17. The plastic material according to claim 16, wherein the stabilizer is selected from the group consisting of antioxidant, light stabilizer, and thermal stabilizer.

18. A process for preparing the polymer particles of the plastic material according to claim 1 comprising
   A) providing an aqueous phase A of water and surfactant;
   B) adding from 10 to 100% by weight of a monomer phase A, comprising
      i) 30 to 99.9% by weight of one or more mono-ethylenically unsaturated monomers I with at least one $C_{12}$-$C_{48}$ n-alkyl side chain;
      ii) 0 to 60% by weight of one or more mono-ethylenically unsaturated monomers II with at least one $C_1$-$C_{11}$ n-alkyl and/or one $C_3$-$C_{48}$ i-alkyl side chain;
      iii) 0.1 to 20% by weight of one or more monomers III with at least two non-conjugated ethylenic double bonds;
      iv) 0 to 69.9% by weight of one or more (hetero) aromatic, mono-ethylenically unsaturated monomers IV;
      v) 0 to 40% by weight of one or more other mono-ethylenically unsaturated monomers V; and
      predispering the mixture with stirring to form an o/w macroemulsion,
      homogenizing the macroemulsion to form an o/w miniemulsion, and
      polymerizing up to a conversion of at least 90% by weight, based on the total weight of monomers I, II, III, IV and V;
   C) adding from 0 to 90% by weight of a monomer phase B, comprising
      i) 0 to 100% by weight of one or more monomers VI from the group of $C_1$-$C_{10}$ alkyl (meth)acrylates;
      ii) 0 to 100% by weight of one or more (hetero) aromatic mono-ethylenically unsaturated monomers VII;
      iii) 0 to 50% by weight of one or more other mono-ethylenically unsaturated monomers VIII;
      polymerizing the mixture up to a conversion of at least 90% by weight, based on the total weight of monomers VI, VII and VIII; and
      isolating the resulting polymer from the aqueous phase, wherein the stated weight percentages of the monomer phases A and B add up to 100% by weight;
   wherein ultrasound reactors, high-pressure homogenizers, rotor-stator systems, systems with static mixers, or combinations thereof are used for the homogenization step for forming the o/w miniemulsion containing the monomer phase A and the aqueous phase A.

19. A process for preparing the plastic material according to claim 1, comprising mixing the polymer particles with the matrix by compounding.

20. A process for preparing the plastic material according to claim 1, comprising mixing the polymer particles with a curable precursor of the matrix plastic, and curing the mixture to plastic parts or to composite materials.

21. The process of claim 20, wherein the plastic parts are sheets or films, and wherein the composite materials are laminated glasses.

* * * * *